US012567034B2

(12) United States Patent (10) Patent No.: US 12,567,034 B2
Morris (45) Date of Patent: Mar. 3, 2026

(54) SYSTEM AND PROCESSES FOR OPTIMIZING INVENTORY

(71) Applicant: Thrive Technologies, Inc., Marietta, GA (US)

(72) Inventor: Louis Rick Morris, Kennesaw, GA (US)

(73) Assignee: Thrive Technologies, Inc., Marietta, GA (US)

( * ) Notice: Subject to any disclaimer, the term of this patent is extended or adjusted under 35 U.S.C. 154(b) by 290 days.

(21) Appl. No.: 18/296,271

(22) Filed: Apr. 5, 2023

(65) Prior Publication Data

US 2023/0316223 A1      Oct. 5, 2023

Related U.S. Application Data

(60) Provisional application No. 63/327,391, filed on Apr. 5, 2022.

(51) Int. Cl.
*G06Q 10/087* (2023.01)
*G06Q 10/0637* (2023.01)
*G06Q 30/0202* (2023.01)

(52) U.S. Cl.
CPC ..... *G06Q 10/087* (2013.01); *G06Q 10/06375* (2013.01); *G06Q 30/0202* (2013.01)

(58) Field of Classification Search
CPC ........... G06Q 10/087; G06Q 10/06375; G06Q 30/0202
See application file for complete search history.

(56) References Cited

U.S. PATENT DOCUMENTS 7,761,346 B2     7/2010  Cooper et al.
11,544,724 B1 *  1/2023  Wick ................. G06Q 30/0202
(Continued)

FOREIGN PATENT DOCUMENTS

WO        2022005459 A1     1/2022

OTHER PUBLICATIONS

International Search Report and Written Opinion for International Application No. PCT/US23/65406, mailed Oct. 24, 2023, 12 Pages.

*Primary Examiner* — Garcia Ade
(74) *Attorney, Agent, or Firm* — Bradley Arant Boult Cummings LLP; Daniel E. Sineway, Esq.

(57) ABSTRACT

The present system and methods generally relate to managing stock of unforecastable supply items and various goods sold by a retailer and/or wholesaler. The present system and methods can employ various techniques to integrate with retailers computing infrastructure and receive data to determine unforecastable supply items of the retailers and/or wholesalers. Using novel techniques, the present system and methods can employ machine learning techniques to predict minimum and maximum stocking requirements for goods sold by the retailers and/or the wholesalers. The present system methods can employ other machine learning model to generate reports, data analyses, predictions, and recommendations associated with the goods sold by the retailer and/or wholesaler. The present system and methods can produce stocking outcomes based on the analyses performed. For example, the present system can update internal stocking data, generate reports associated with various goods, and/or generate orders for identified low stock items.

22 Claims, 7 Drawing Sheets

(56)  References Cited

U.S. PATENT DOCUMENTS

| 2014/0278981 | A1 |   | 9/2014 | Mersov et al. |   |
|---|---|---|---|---|---|
| 2018/0341898 | A1 | * | 11/2018 | Bose | .................. G06Q 30/0202 |
| 2019/0130425 | A1 | * | 5/2019 | Lei | .................... G06Q 30/0201 |
| 2021/0192435 | A1 | * | 6/2021 | Fernandes | ........... G06Q 10/087 |
| 2021/0398068 | A1 | * | 12/2021 | Adato | .................. G06Q 20/208 |
| 2022/0187847 | A1 | * | 6/2022 | Cella | ............... G06Q 10/06395 |

* cited by examiner

300

START

301
RETRIEVE INPUT DATA

303
EXTRACT ONE OR MORE FEATURES

305
DISCRETIZE INPUT DATA

307
GENERATE VARIOUS HISTOGRAMS

309
UPDATE PROCESSED DATA

END

600

START

601
RETRIEVE INPUT DATA

603
PROCESS DATA

605
TRAIN MODEL FOR PARTICULAR GOOD

607
CALCULATE ZERO-DEMAND PROBABILITY SCORE FOR PARTICULAR GOOD

609
GENERATE A NO-STOCKING REQUEST FOR THE ONE OR MORE GOODS

END

SYSTEM AND PROCESSES FOR OPTIMIZING INVENTORY

CROSS-REFERENCE TO RELATED APPLICATIONS

This application claims the benefit of and priority to U.S. Provisional Patent Application No. 63/327,391, entitled "SYSTEM AND METHODS FOR OPTIMIZING INVENTORY," filed Apr. 5, 2022, the entire contents and substance of which are incorporated herein by reference as if fully set forth below.

TECHNICAL FIELD

The present systems and methods generally relate to monitoring, managing, and optimizing supply, and more particularly to optimizing low-volume and irregular-volume supply using machine learning techniques.

BACKGROUND

Predicting demand and managing supply levels are critical to any successful retail or wholesale establishment. However, there is generally a significant portion of stocked items (stock-keeping units ("SKUs")) that have unpredictable demand. In these situations, stocked item demand is either too low (e.g., under ten acquisitions per year) or too sporadic (e.g., various quantities may be acquired at unpredictable times during the year) to have reliably accurate forecasts. The unpredictable demand of various SKUs can impact any particular establishment. In one example, if demand is less than forecasted, the establishment may have too much supply and risks accumulating more "dead stock" (e.g., unsold merchandise measured over a particular amount of time). In another example, if forecasts are too low, the establishment may run out of supply and disappoint clients.

Prediction accuracy at the SKU level can substantially impact an establishment's bottom line by reducing supply chain expenses while improving the client experience. Accurate predicting benefits include optimizing supply on hand, lowering transportation expenses (reduced need to move stock around daily), and boosting confidence in your company's overall fiscal projections.

Currently, SKUs that are difficult to forecast are generally handled by using manual static minimums ("Mins") based on an analysis of historical demand numbers and arbitrary values determined by a representative based on a "gut" feeling of how much they can sell. Essentially, this supply policy dictates the minimum quantity of a particular SKU to stock at a particular location. An issue with manual static Mins is that since they are manual arbitrary numbers (not calculated), and because an establishment may have thousands of low and/or irregular volume items, supply managers generally can only update them infrequently, if at all. Further, SKU volume and/or characteristics are often in constant flux, so the identified Mins can become unreliable and unusable in a relatively short period of time. Thus, there exists an unresolved need for systems and methods that can identify low and irregular-volume items and can dynamically calculate optimal stocking levels for such items.

BRIEF SUMMARY OF DISCLOSURE

Briefly described, and in various embodiments, the present disclosure relates to systems and processes for managing stock of unforecastable supply items and various goods sold by a retailer and/or wholesaler. In certain embodiments, the disclosed system can include a machine learning infrastructure used to ingest and analyze data associated with one or more goods sold by a retailer to generate a stocking recommendation for the particular one or more goods. In some embodiments, the disclosed system can generate various analyses associated with the one or more goods of the retailer. For example, the disclosed system can predict minimum and maximum stocking values to meet the demand for one or more goods, recommended stocking intervals for the one or more goods, and/or any other particular insights for minimizing expenditures and expenses associated with stocking one or more goods and unforecastable supply items.

In at least one embodiment, the disclosed system may integrate with retailer devices that accumulate and store stocking and transaction data associated with one or more goods. For example, the disclosed system may connect to the retailer devices though an Application Programming Interface (API) system to retrieve the data associated with the one or more goods. In one or more embodiments, on receiving the data associated with the one or more goods, the disclosed system can pre-process the input data to generate processed data. In certain embodiments, pre-processing can include but is not limited to retrieving one or more features from the input data, discretizing the input data, and generating various histograms associated with the input data. In some embodiments, on generating the processed data, the disclosed system may split the processed data and the input data into a training data set and a testing data set. In certain embodiments, the disclosed system may employ the training data set and the testing data set to train one or more machine learning algorithms.

In particular embodiments, the disclosed system can employ various machine learning algorithms to produce distinct recommendations, generate various outputs, and formulate various insights. For example, the disclosed system can employ the LightGBM open-source library to train a binary classification system to generate a zero-demand probability score. In various embodiments, the zero-demand probability score may define the probability that a particular analyzed good will have a demand of zero over a particular period of time. In another example, the disclosed system can employ the LightGBM library to train a classification algorithm to generate a high-demand classification score. In certain embodiments, the high-demand classification score can define the probability that the demand for a particular good will be greater than 150% of the most common stock value for the particular good. In yet another example, the disclosed system can employ the LightGBM library to train a Poisson Regression algorithm to generate a raw-demand score for the one or more goods. In some embodiments, the raw-demand score can define a value that predicts the likely future demand at a particular point in time for the one or more goods. In yet another example, the disclosed system can employ the LightGBM Library to train a machine learning model to generate a Quantile regression of the one or more goods.

In one or more embodiments, the disclosed system can interact with one or more manufacturers and/or retailers to automatically and in real time update stocking minimums for unforecastable supply items and/or other goods. For example, based on the analyses of the machine learning models of the disclosed system, the disclosed system can generate an order for all goods identified under its predicted minimums.

According to a first aspect, a machine learning system, comprising: A) a data store comprising observation data and a plurality of features, the observation data associated with a good stocked by a retailer; and B) at least one processor in communication with the data store, the at least one processor being configured to: 1) retrieve from the data store a first subset of the observation data; 2) extract from the first subset of the observation data a first subset of the plurality of features; 3) select a machine learning model based on the first subset of the observation data and the first subset of the plurality of features; 4) retrieve from the data store a second subset of the observation data; 5) extract from the second subset of the observation data a second subset of the plurality of features; 6) calculate a zero-demand probability score by applying the machine learning model to the second subset of the observation data and the second subset of the plurality of features; and 6) generate a no-stocking request for the good stocked by the retailer based on the zero-demand probability score.

According to the machine learning system of the first aspect or any other aspect, wherein the observation data further comprises client data, item data, stock value data, stock location data, point in time data, transaction quantity data, or a combination thereof.

According to the machine learning system of the first aspect or any other aspect, wherein the plurality of features further comprise demand to-date data, order-timing data, average demand data, minimum demand data, maximum demand data, demand range data, demand variance data, skew data, average lead time data, number of orders data, or a combination thereof.

According to the machine learning system of the first aspect or any other aspect, wherein the at least one processor is further configured to: A) train the machine learning model using a training data set, wherein the training data set comprises a training subset of the first subset of the observation data and the first subset of the plurality of features; B) test the machine learning model using a testing data set, wherein the testing data set comprises a testing subset of the first subset of the observation data and the first subset of the plurality of features; C) generate a validation score for the machine learning model; and D) in response to the validation score falling below a validation score threshold, adjusting at least one of a hyper-parameter associated with the machine learning model.

According to the machine learning system of the first aspect or any other aspect, wherein at least one of the hyper-parameter comprises at least one of a number of boosting rounds, a decision tree depth, a learning rate, a minimum data per decision tree leaf, a feature fraction value, and a number of leaves.

According to the machine learning system of the first aspect or any other aspect, wherein the validation score threshold comprises a value for validating that the machine learning model correctly predicted the zero-demand probability score.

According to the machine learning system of the first aspect or any other aspect, wherein the at least one processor is further configured to: A) retrieve an updated subset of the observation data after retrieving the first subset of the observation data and the second subset of the observation data; B) extract from the updated subset of the observation data an updated subset of the plurality of features; C) calculate a second zero-demand probability score by applying the machine learning model to the updated subset of the observation data and the updated subset of the plurality of features; and D) generate a second no-stocking request for the good based on the second zero-demand probability score.

According to the machine learning system of the first aspect or any other aspect, wherein the machine learning model comprises a gradient boosting algorithm, a Drop-outs meet Multiple Additive Regression Tree (DART), a Gradient-based One-Side Sampling (GOSS), or a Random Forest algorithm.

According to the machine learning system of the first aspect or any other aspect, wherein the at least one processor is further configured to: A) select a second machine learning model based on a third subset of the observation data, a third subset of the plurality of features, and the zero-demand probability score; and B) calculate a high-demand classification score by applying the second machine learning model to the third subset of the observation data, the third subset of the plurality of features, and the zero-demand probability score, wherein the high-demand classification score comprises a likelihood that demand for the good is greater than 150% of a current stock mode.

According to the machine learning system of the first aspect or any other aspect, wherein the at least one processor is further configured to: A) select a third machine learning model based on a fourth subset of the observation data, a fourth subset of the plurality of features, the zero-demand probability score, and the high-demand classification score; and B) generate a raw-demand score by applying the third machine learning model to the fourth subset of the observation data, the fourth subset of the plurality of features, the zero-demand probability score, and the high-demand classification score.

According to the machine learning system of the first aspect or any other aspect, wherein the at least one processor is further configured to: A) select a fourth machine learning model based on a fifth subset of the observation data, a fifth subset of the plurality of features, the zero-demand probability score, the high-demand classification score, and the raw-demand score; and B) generate a Quantile regression model by applying the fourth machine learning model to the fifth subset of the observation data, the fifth subset of the plurality of features, the zero-demand probability score, the high-demand classification score, and the raw-demand score.

According to the machine learning system of the first aspect or any other aspect, further comprising generating a report comprising the zero-demand probability score, the high-demand classification score, the raw-demand score, and the Quantile regression model.

According to a second aspect, a method for optimizing product supply levels comprising: A) retrieving from a data store a first subset of an observation data, the observation data associated with a good stocked by a retailer; B) extracting, via at least one processor, a first subset of a plurality of features from the first subset of the observation data; C) selecting, via the at least one processor, a machine learning model based on the first subset of the observation data and the first subset of the plurality of features; D) retrieving from the data store a second subset of the observation data; E) extracting, via at least one processor, the second subset of the plurality of features from the second subset of the observation data; F) calculating, via the at least one processor, a zero-demand probability score by applying the machine learning model to the second subset of the observation data and the second subset of the plurality of features; and G) generating, via the at least one processor, a no-stocking request for the good stocked by the retailer based on the zero-demand probability score.

According to the method of the second aspect or any other aspect, wherein processing the first subset of the observation data further comprises discretizing the observation data into a plurality of bins and generating one or more histograms of the observation data.

According to the method of the second aspect or any other aspect, wherein selecting the machine learning model further comprises: A) generating, via the at least one processor, a training data set and a testing data set by randomly splitting a combination of the first subset of the observation data and the first subset of the plurality of features into an 60% partition and a 40% partition, the training data comprising the 60% partition and the testing data set comprising the 40% partition; B) applying, via the at least one processor, the machine learning model with the testing data set and the training data set; and C) adjusting, via the at least one processor, a plurality of hyper-parameters of the machine learning model, the plurality of hyper-parameters comprising a number of boosting rounds, a decision tree depth, a learning rate, a minimum data per decision tree leaf, a feature fraction value, and a number of leaves.

According to a third aspect, a method for optimizing product supply levels comprising: A) processing, via at least one processor, a plurality of demand prediction heuristic rules associated with a good stocked by a retailer; B) generating, via the at least one processor, a policy based on the demand prediction heuristic rules, wherein the policy comprises a minimum and a maximum stocking requirement for the good; C) simulating, via the at least one processor, the policy against historical transaction data associated with the good; D) generating, via the at least one processor, a plurality of simulation scores for the policy; E) analyzing, via the at least one processor, the plurality of simulation scores for the policy; and F) in response to the plurality of simulation scores falling below a simulation confidence threshold, optimize, via the at least one processor, the policy.

According to the method of the third aspect or any other aspect, wherein the simulation confidence threshold comprises a value for validating that the policy correctly stocked the good.

According to the method of the third aspect or any other aspect, wherein optimizing the policy further comprises; A) selecting, via the at least one processor, a machine learning optimization algorithm based on the plurality of simulation scores; B) applying, via the at least one processor, the machine learning optimization algorithm to the minimum and the maximum stocking requirement of the policy; C) generating, via the machine learning optimization algorithm, an updated plurality of the demand prediction heuristic rules; and D) generating, via the at least one processor, an updated policy based on the updated plurality of the demand prediction heuristic rules for the good stocked by the retailer.

According to the method of the third aspect or any other aspect, wherein optimizing the policy further comprises: A) simulating, via the at least one processor, the updated policy against the historical transaction data associated with the good; B) generating, via the at least one processor, a second plurality of simulation scores for the updated policy; C) analyzing, via the at least one processor, the second plurality of simulation scores for the policy; and D) in response to the second plurality of simulation scores falling below the simulation confidence threshold, optimize, via the at least one processor, the updated policy.

According to the method of the third aspect or any other aspect, wherein analyzing the plurality of simulation scores further comprises: A) generating, via the at least one processor, a plurality of normal distributions associated with the plurality of simulation scores; and B) identifying, via the at least one processor, a subset of the plurality of simulation scores that fall outside of a predetermined range of the plurality of normal distributions, wherein the predetermined range comprises above a 75th percentile and below a 25th percentile.

According to the method of the third aspect or any other aspect, wherein the plurality of simulation scores further comprise an average period service level value, an average weekly on-hand value, an average weekly transaction value, an average weekly lost transaction value, an average twelve month demand value, and an average twelve month over-stock value.

According to the method of the third aspect or any other aspect, wherein processing the plurality of demand prediction heuristic rules further comprises: A) retrieving from a data store the plurality of demand prediction heuristic rules comprising observation data of the good stocked by the retailer; B) extracting, via the at least one processor, a plurality of features from the observation data; and C) augmenting, via the at least one processor, a the demand prediction heuristic rules with a subset of the plurality of features.

These and other aspects, features, and benefits of the claimed innovation(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
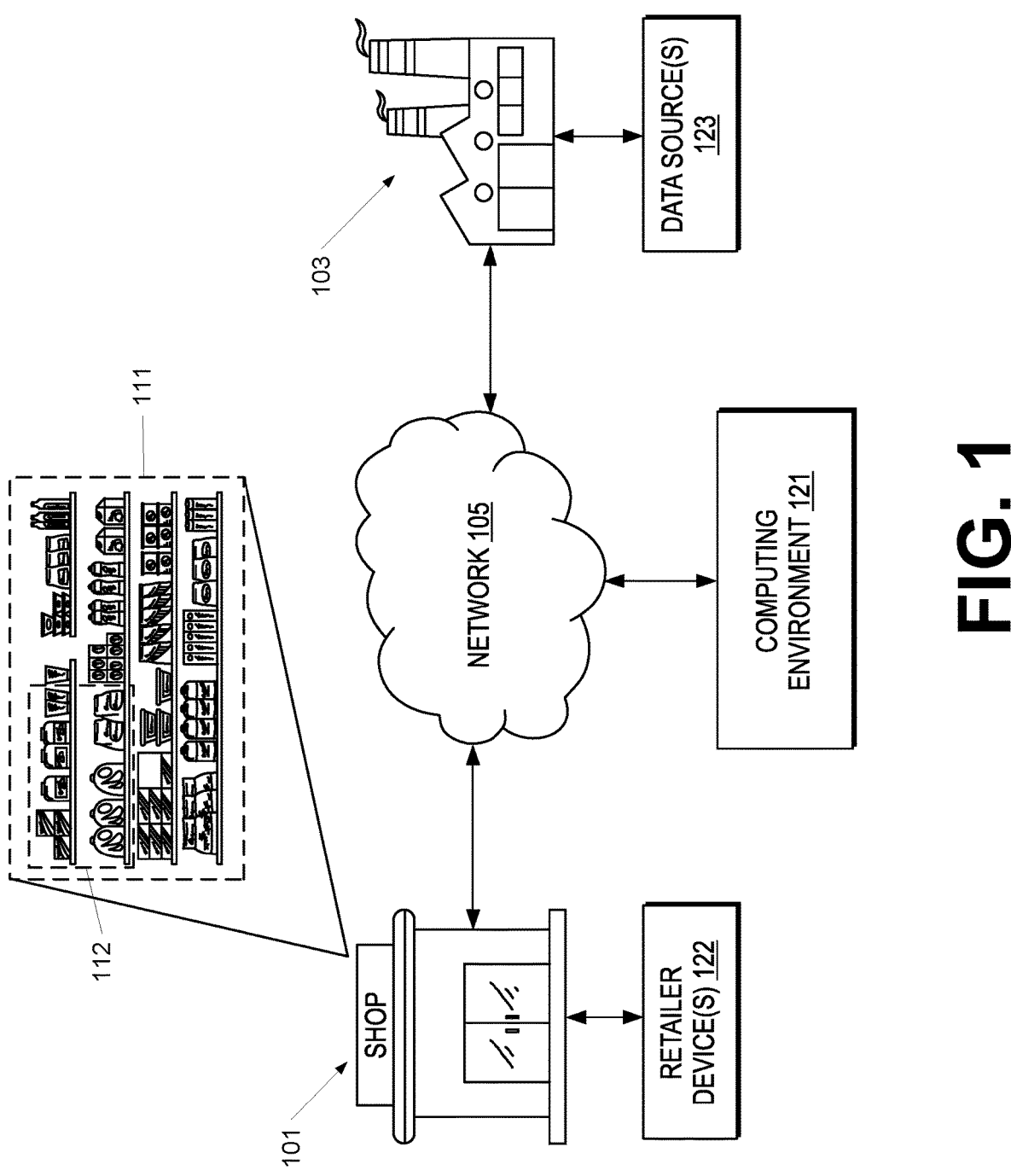
FIG. 1 illustrates an example use case scenario of a supply management system, according to one embodiment of the present disclosure.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and processes for managing stock of unforecastable supply items and various goods sold by a retailer and/or wholesaler. In certain embodiments, the disclosed system can include a machine learning infrastructure used to ingest and analyze data associated with one or more goods sold by a retailer to generate a stocking recommendation for the particular one or more goods. In some embodiments, the disclosed system can generate various analyses associated with the one or more goods of the retailer. For example, the disclosed system can predict minimum and maximum stocking values to meet the demand for one or more goods, recommended stocking intervals for the one or more goods, and/or any other particular insights for minimizing expenditures associated with stocking one or more goods and unforecastable supply items.

In at least one embodiment, the disclosed system may integrate with retailer devices that accumulate and store stocking and transaction data associated with one or more goods. For example, the disclosed system may connect to the retailer devices though an Application Programming Interface (API) system to extract the data associated with the one or more goods. In some embodiments, on receiving the data associated with the one or more goods, the disclosed system can pre-process the input data to generate processed data. In various embodiments, pre-processing can include but is not limited to extracting one or more features from the input data, discretizing the input data, and generating various histograms associated with the input data. In one or more embodiments, on generating the processed data, the disclosed system may split the processed data and the input data into a training data set and a testing data set. In certain embodiments, the disclosed system may employ the training data set and the testing data set to train one or more machine learning algorithms.

In particular embodiments, the disclosed system can employ various machine learning algorithms to produce distinct recommendations, generate various outputs, and formulate various insights. For example, the disclosed system can employ the LightGBM open-source library to train a binary classification system to generate a zero-demand probability score. In some embodiments, the zero-demand probability score may define the probability that a particular analyzed good will have a demand of zero over a particular period of time. In another example, the disclosed system can employ the LightGBM library to train a classification algorithm to generate a high-demand classification score. In certain embodiments, the high-demand classification score can define the probability that the demand for a particular good will be greater than 150% of the most common stock value for the particular good. In yet another example, the disclosed system can employ the LightGBM library to train a Poisson Regression algorithm to generate a raw-demand score for the one or more goods. The raw-demand score can define a value that predicts the likely future demand at a particular point in time for the one or more goods. In yet another example, the disclosed system can employ the LightGBM Library to train a machine learning model to generate a Quantile regression of the one or more goods.

In one or more embodiments, the disclosed system can interact with one or more manufacturers and/or retailers to automatically and in real time update stocking minimums for unforecastable supply items and/or other goods. For example, based on the analyses of the machine learning models of the disclosed system, the disclosed system can generate an order for all goods identified under its predicted minimums.

Exemplary Embodiments

Referring now to the figures, for the purposes of example and explanation of the fundamental processes and components of the disclosed systems, reference is made to FIG. 1, which illustrates an example stocking environment 100. As will be understood and appreciated, the stocking environment 100 shown in FIG. 1 represents merely one approach or embodiment of the present concept, and other aspects are used according to various embodiments of the present concept.

In one or more embodiments, the stocking environment 100 illustrates a generally standard arrangement between a retailer 101 and a manufacturer 103. In some embodiments, the retailer 101 can include any brick-and-mortar retailer, wholesaler, online retailer, and/or any particular field that stocks and sells one or more goods 111 (also referred to as stock-keeping units (SKUs)). For example, the retailer 101 can include but is not limited to a grocery store, a sporting store, a hardware store, a car parts distributor, a construction parts distributor, or an office supply wholesaler. In some embodiments, the manufacturer 103 can include any company and/or distributor that provides the one or more goods 111 to the retailer 101. In certain embodiments, the retailer 101 and the manufacturer 103 function as the same entity.

In particular embodiments, the retailer 101 is traditionally tasked with managing and maintaining supply of the one or more goods 111. In at least one embodiment, traditional techniques for managing the supply of the one or more goods 111 may include a representative associated with the retailer 101 manually updating a static minimum (referred to herein as "Mins") for each of the one or more goods 111. In some embodiments, when a retailer 101 identifies that at least one of the goods 111 has reached its corresponding Mins, the retailer 101 can order a predetermined amount of the particular good 111 from the manufacturer 103. In at least one embodiment, the task of managing the supply of the one or more goods 111 becomes increasingly difficult or impossible for the representative when dealing with a large volume of supply (e.g., over 100 goods 111) and/or the goods 111 include one or more unforecastable supply items 112. For example, the representative may find it difficult to predict the next time to stock and the amount of supply to stock for the one or more unforecastable supply items 112

(e.g., seasonal goods, low transaction goods, goods with sporadic transactions). In particular embodiments, the unforecastable supply items 112 can be a subset of the one or more goods 111 stocked and sold by the retailer 101.

In particular embodiments and as discussed in further detail herein, a retailer 101 can employ a stock management system 200 (see FIG. 2) to automatically manage the supply of the one or more goods 111. In various embodiments, and as further described in relation to FIG. 2, the stock management system 200 can monitor, manage, and optimize supply, and more specifically, identify and optimize the unforecastable supply items 112 from the one or more goods 111. As used herein, and in one or more embodiments, the unforecastable supply items 112 may include low transaction volume items, irregular (i.e., intermittent) demand items, new items, maturing items, and/or seasonal items. In various embodiments, the retailer 101 may employ the stock management system 200 to reduce expenses and/or increase proceeds by limiting supply issues caused by inaccurate predictions of the unforecastable supply items 112. In some embodiments, the retailer may employ the stock management system 200 to protect against lost proceeds from out-of-stock items, excess expenses from overstocked items and/or dead supply, and other similar issues.

In certain embodiments, the retailer 101 can include one or more retailer devices 122 to manage supply of the one or more goods 111. In particular embodiments, the retailer devices 122 may lack the capability of accurately predicting, simulating, and monitoring the transactions and supply of unforecastable supply items 112. In some embodiments, the retailer 101 can employ the stock management system 200 to integrate with and access the data of the retailer devices 122. For example, and as further described in relation to FIG. 2, the stock management system 200 can include a computing environment 121 that communicates over a network 105 with the one or more retailer devices 122 of the retailer 101. Continuing this example, the computing environment 121 can receive data from the retailer devices 122 and generate recommendations to better manage and optimally stock the unforecastable supply items 112.

In certain embodiments, the computing environment 121 can receive supply data (both current and historical) from the retailer devices 122 and/or one or more data sources 123. In various embodiments, the retailer device 122 and/or the data sources 123 can include third-party supply replenishment systems (or other suitable systems, such as an Enterprise Resource Planning ("ERP") system) used for aggregating and storing supply data. In some embodiments, the data sources 123 are incorporated as a component of the retailer 101, the retailer devices 122, the computing environment 121, or a combination thereof. In one or more embodiments, the computing environment 121 can process and analyze the supply data to identify the unforecastable supply items 112. In particular embodiments, the computing environment 121 generates a machine learning model such that the computing environment 121 can identify and optimally stock the unforecastable supply items 112. In one or more embodiments, the computing environment 121 may integrate with the data source 123 to automatically replenish, order, and manage the stock of the unforecastable supply items 112. For example, the computing environment 121 can determine the order amount for one or more unforecastable supply items 112 by analyzing the supply data (including historical transaction data). In certain embodiments, the computing environment 121 can automatically adjust stocking levels for the unforecastable supply items 112 to mitigate future stocking issues.

Figure 2:
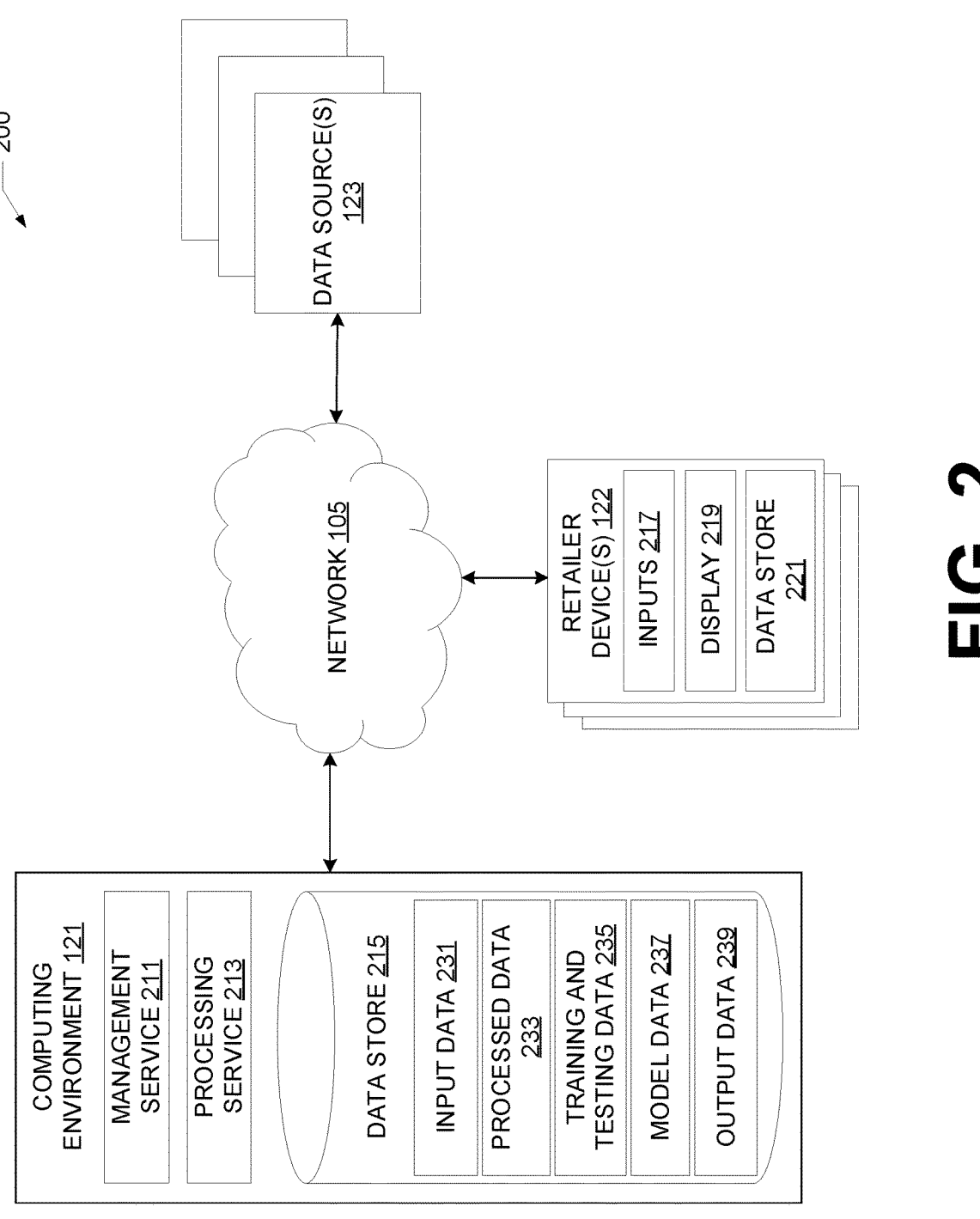
FIG. 2 illustrates various components of the supply management system, according to one embodiment of the present disclosure.

Referring now to FIG. 2, illustrated is the stock management system 200, according to one embodiment of the present disclosure. In one or more embodiments, the stock management system 200 includes the computing environment 121, the one or more retailer devices 122, and the one or more data sources 123, which are in data communication with each other via a network 105. In at least one embodiment, the network 105 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

In various embodiments, the computing environment 121 can include, for example, a server computer or any other system providing computing capability. Alternatively, in at least one embodiment, the computing environment 121 can employ more than one computing device that can be arranged, for example, in one or more server banks or computer banks, or other arrangements. In some embodiments, such computing devices can be located in a single installation or can be distributed among many different geographical locations. For example, the computing environment 121 can include one or more computing devices that together can include a hosted computing resource, a grid computing resource, and/or any other distributed computing arrangement. In some examples, the computing environment 121 can correspond to an elastic computing resource where the allotted capacity of processing, network, storage, or other computing-related resources can vary over time.

In some particular, various applications and/or other functionality can be executed in the computing environment 121, according to various embodiments. In certain embodiments, various data is stored in a data store 215 that is accessible to the computing environment 121. In one or more embodiments, the data store 215 can be representative of one or more of data stores 215 as can be appreciated. In certain embodiments, the data stored in the data store 215, for example, can be associated with the operation of the various applications and/or functional entities described below.

In at least one embodiment, the data stored in the data store 215 includes, for example, list of data and potentially other data. In particular embodiments, the data store 215 can include but is not limited to input data 231, processed data 233, training and testing data 235, model data 237, and output data 239.

In one or more embodiments, the input data 231 can include any data received by the computing environment 121 from the retailer devices 122 and/or the data sources 123. For example, the input data 231 can include supply data, observation data, and/or any data associated with the one or more goods 111. In some embodiments, the supply data and the observation data can be substantially similar. For example, the supply data can include but is not limited to transaction numbers, supply stock, location-specific stock, historical stock information, historical transaction information, historical acquiring patterns, item names, manufacture 103 names, item value, and/or any other particular information associated with each of the one or more goods 111. In certain embodiments, the supply data can further include transactions for the last 12 months of one or more goods 111 (including timestamps, orders, client identification numbers, items, locations, quantities, values), unit value, active status, stock status, on hand units, minimum order quantity, incremental order quantity, pack size, current minimums and/or maximums (if exists), lead time, item origination/established date if available (that way a policy can identify new items and treat them differently), and one or more user-defined fields.

In various embodiments, the observation data of the input data 231 can include a series of associated client data, item data, stock value data, stock location data, point-in-time data, and transaction quantity data for the one or more goods 111. For example, the client data can include information related to the retailer 101 (e.g., name, locations, size, retailer type, associated regions, transaction history, fiscal data). In another example, the item data can include information associated with the one or more goods 111 sold by the specified retailer 101 (e.g., name, weight, value, manufacturer name, serial number, barcode value). In yet another example, the stock value data can include stocking data specific to the one or more goods 111 stocked by the retailer 101 (e.g., present stock, historical stocking values). In yet another example, the stock location data can include information defining the location of the one or more goods 111 stocked by the retailer 101. In yet another example, the point in time data can include a date associated with a stocking value of one or more goods 111 stocked by a retailer 101. In yet another example, the transaction quantity data can define the number of transaction for the particular goods 111 stocked by the retailer 101. In various embodiments, the observation data can be interpreted as a single data entry associated with one or more goods 111 stocked by the retailer 101. For example, the observation data can define the transaction and stock quantity for one good 111 at a specific point in time for one retailer 101. In one or more embodiments, the observation data can include various data entries defining transaction and stock quantity for one good 111 at a specific point in time for one retailer 101. In at least one embodiment, the observation data can include various data entries defining transaction and stock quantity for more than one good 111 at sold and stocked at a specific point in time at one retailer 101. For example, the observation data can include 10,000,000 data entries (commonly referred to as "rows") or more defining client data, item data, stock value data, stock location data, point-in-time data, and transaction quantity data for the one or more goods 111.

In one or more embodiments, the observation data of the input data 231 can include a tabular file type (e.g., comma-separated values (CSV) file type, table-delimited file type, fixed file format, Microsoft Excel Spreadsheet (xls/xlsx) file type). For example, in a traditional tabular file type, each row of the observation data may represent one acquiring transaction for one good 111 at one particular retailer 101. In certain embodiments, each column of the observation data can represent one or more features associated with the observation data. For example, the observation data can include an xls file where each row represents one hundred transactions made at a particular retailer 101 on a Friday. Continuing this example, xls file of the observation data can include 10 columns, such as, a store location, a store name, a client name, a good name, a good number, an acquiring amount, an acquiring value, a stock (e.g., supply) value of the good before acquiring, a stock value of the good after acquiring, and time of acquiring. Continuing this example, one non-limiting example observation data entry (e.g., one row) from the xls file can include the store location of 123 main street SW Atlanta, GA 30342, the store name of Dublix #321, the client name of Dublix Groceries, the good name of origami booklet, the good number of 930473987, the good acquiring amount of two (e.g., one client bought two origami book), the good value of $9.99, the stock value of the good before acquiring at 11, the stock value of the good after acquiring at 10, and the time of the transaction of 1:23 PM EST on Jan. 4, 2023. In various embodiments, each observation data entry from the observation data can represent one particular transaction of a particular good 111 at a particular retailer 101.

In some embodiments, the input data 231 can include demand prediction heuristic rules. In various embodiments, the demand prediction heuristic rules can include any particular rule that may govern a heuristic algorithm of the model data 237. In certain embodiments, the demand heuristic rules may include any observation data from the input data 231 and/or any data from the processed data 233. For example, a demand prediction heuristic rule may include a restocking minimum for a particular good 111 by employing a simple averaging technique of the average number of goods 111 sold over the last twelve months.

In some embodiments, the processed data 233 can include any data processed by the computing environment 121, the retailer devices 122, and/or any particular system. In various embodiments, the processed data 233 can include but is not limited to the one or more features, histograms, and calculated metrics for the one or more goods 111. In certain embodiments, the one or more features may be defined as independent variables extracted by the computing environment 121 from the input data 231. For example, the one or more features can include but are not limited to a last 30-day demand metric for one or more goods 111, one or more demand to data quantities for varying time intervals, number of days since last order, month of year of high volume orders for one or more goods 111, week of year of high volume orders for one or more goods 111, average stock for one or more goods 111, average transactions for one or more goods 111, minimum number of stock for one or more goods 111, maximum number of stock for one or more goods 111, standard deviation of transactions and stock for one or more goods 111, range for transactions and stock for one or more goods 111, variance for transactions and stock for one or more goods 111, and statistical skewness data for the last 30 registered transactions/demand for one or more goods. In some embodiments, the one or more features can further include a demand to-date data, an order-timing data, an average demand data, a minimum demand data, a maximum demand data, a demand range data, a demand variance data, a skew data, an average lead time data, and a number of orders data. In one or more embodiments, the histograms can include one or more histograms generated by the computing environment 121 that demonstrate discretized input data 231 into one or more bins. In some embodiments, the processed data 233 can include scaled features of the one or more features generated by the computing environment 121.

In certain embodiments, the processed data 233 can include one or more policies associated with the goods 111. In at least one embodiment, the policies may be defined as stocking rules that dictate the stock level of the one or more goods 111 at the one or more retailers 101. For example, the processing service 213 can assign a ten-piece Hex Key set sold by a hardware store retailer a policy defining the minimum stock of the particular good 111, the maximum stock of the particular good 111, and the optimal stock of the particular good 111. Continuing this example, the minimum stock of the particular good 111 may be 10 units, the maximum stock of the particular good 111 may be 20 units, and the optimal stock of the particular good 111 may be 12 units. In some embodiments, the policies may include but are not limited to minimum stock of the particular good 111, maximum stock of the particular good 111, seasonal minimum and maximum stock of the particular good 111, yearly optimal stock of the particular good 111, optimal stock of the particular good 111 for high value clients, and demand statistics for generating a zero-stock request. In particular embodiments, the policies may include the various probabilities, classifications, regression algorithms, and other metrics generated by the processing service 213 employing the model data 237. In various embodiments, the policies can include the one or more features extracted by the processing service 213.

In one or more embodiments, the processed data 233 can include one or more scoring statistics. In certain embodiments, the scoring statistics can include any output from the processing service 213 generated while performing a process 500 (see FIG. 5). In particular embodiments, the scoring statistics can be defined as a metric for rating the relative quality of the one or more machine learning models, the one or more policies, and/or one or more simulations. In at least one embodiment, the scoring statistics may include policy scoring statistics, machine learning algorithm scoring statistics, and simulation scoring statistics. For example, the processing service 213 may employ a simulation model to score a generated policy against the previous 6 months' worth of demand data for a particular retailer 101. Continuing this example, the score may include a 0 to 100 value rating the policies ability to meet the demand of the previous 6 months, where 100 represents a perfect policy and 0 represents a failed policy.

In at least one embodiment, the training and testing data 235 can include a training data set and a testing data set used to train the one or more machine learning models from the model data 237. In particular embodiments, the training and testing data 235 can include the input data 231 and the processed data 233. In some embodiments, the computing environment 121 employs the training data set to train the one or more machine learning models. In various embodiments, the computing environment 121 employs the testing data set to test the one or more machine learning models. In particular embodiments, the training data set can include an 80% randomly aggregated subset of the input data 231 and the processed data 233. In various embodiments, the testing data can include a 20% randomly aggregated subset of the input data 231 and the processed data 233, where the training data set and the testing data set are mutually exclusive. In one or more embodiments, the testing data set and the training data set include any number of different percentage breakdown ranges up to 100%. In one non-limiting example, the training data set can include a 70% randomly aggregated subset of the input data 231 and the processed data 233, while the testing data set includes a 30% randomly aggregated subset of the input data 231 and the processed data 233. In another non-limiting example, the training data set can include a 60% randomly aggregated subset of the input data 231 and the processed data 233, while the testing data set includes a 40% randomly aggregated subset of the input data 231 and the processed data 233.

In particular embodiments, the model data 237 can include any information used to process, train, and implement machine learning models (also referred to herein as machine learning algorithms), artificially intelligent systems, and/or natural language processing systems. Non-limiting examples of models stored in the model data 237 can include topic modelers, neural networks, linear regression, logistic regression, ordinary least squares regression, stepwise regression, multivariate adaptive regression splines, ridge regression, least-angle regression, locally estimated scatterplot smoothing, decision trees, random forest classification, support vector machines, Bayesian algorithms, hierarchical clustering, k-nearest neighbors, K-means, expectation maximization, association rule learning algorithms, learning vector quantization, self-organizing map, locally weighted learning, least absolute shrinkage and selection operator, elastic net, feature selection, computer vision, dimensionality reduction algorithms, gradient boosting algorithms, and combinations thereof. In particular embodiments, neural networks can include but are not limited to uni- or multilayer perceptron, convolutional neural networks, recurrent neural networks, long short-term memory networks, auto-encoders, deep Boltzmann machines, deep belief networks, back-propagations, stochastic gradient descents, Hopfield networks, and radial basis function networks. In various embodiments, the model data 237 can include a plurality of models stored in the model data 237 of varying or similar composition or function. In certain embodiments, the model data 237 can include various other machine learning models including, but not limited to, multiclass classification algorithms (e.g., multiclass logistic regression, multiclass neural network, multiclass decision forest, one-vs-all multiclass, multiclass boosted decision tree, etc.), latent Dirichlet allocation (LDA); term frequency-inverse document frequency (TF-IDF); k-means clustering; and any other model suitable to perform the functions of the stock management system 200.

In particular embodiments, the models stored in the model data 237 can include various properties that can be adjusted and optimized by the computing environment 121 during model training. In various embodiments, the properties include any parameter, hyper-parameter, configuration, or setting of the model stored in the model data 237. Non-limiting examples of properties include coefficients or weights of linear and logistic regression models, weights and biases of neural network-type models, cluster centroids in clustering-type models, train-test split ratio, learning rate (e.g., gradient descent), choice of optimization algorithm (e.g., gradient descent, gradient boosting, stochastic gradient descent, Adam optimizer, XGBoost, etc.), choice of activation function in a neural network layer (e.g., Sigmoid, ReLU, Tanh, etc.), choice of value or loss function, number of hidden layers in a neural network, number of activation units (e.g., artificial neurons) in each layer of a neural network, drop-out rate in a neural network (e.g., drop-out probability), number of iterations (epochs) in training a neural network, number of clusters in a clustering task, Kernel or filter size in convolutional layers, pooling size, and batch size.

In particular embodiments, the model data 237 can include various libraries for implementing one or more machine learning algorithms. For example, the model data 237 can include a Light Gradient-Boosting Machine (Light-GBM) library. In various embodiments, the LightGBM library is an open-source machine learning library for implementing gradient boosting frameworks that use tree-based learning on the training and testing data 235. In some embodiments, the LightGBM library can include various features, parameters, algorithms, systems, and setting for implementing gradient boosting ensembles and decision tree algorithms for various machine learning systems. In various embodiments, the LightGBM library can include various machine learning outcomes, for example, an L2 loss regression application, an L1 loss regression application, Huber loss regression application, Fair loss regression application, a Poisson regression application, a Quantile regression application, a Mean absolute percentage error (MAPE) loss regression application, Gamma regression with a log-link application, a binary classification application, a multiclass classification application, a cross-entropy application, and a ranking application. In one or more embodiments, the Light-GBM library can include various boosting techniques, such as Gradient Boosting Decision Tree, Random Forest, Drop-outs meet Multiple Additive Regression Trees (DART), and Gradient-based One-Side Sampling (GOSS). In at least one embodiment, the LightGBM library stored in the model data 237 can include various parameters such as but not limited to a number of boosting rounds, a decision tree depth, a learning rate, a minimum data per decision tree leaf, a feature fraction value, and a number of leaves for the decision trees. In particular embodiments, the LightGBM library can include a histogram-based gradient boosting machine.

In particular embodiments, the model data 237 can include one or more heuristic algorithms. In various embodiments, the heuristic algorithms can include any particular simple mathematical calculation to predict the demand of a particular good 111. For example, the heuristic algorithms can include but are not limited to minimum calculation algorithms, maximum calculations algorithms, mode analysis, monthly averages, weekly averages, yearly averages, quarterly averages, and/or any particular simple mathematical calculation for determining the predicted demand. For example, the processing service 213 may employ a simple averaging technique to determine the average demand of a particular good 111 over the last three winters. Continuing this example, the processing service 213 may set one or more policies to include a minimum stock amount equivalent to the average over the last three winters.

In some embodiments, the output data 239 can include any particular output generated by the computing environment 121. In particular embodiments, the output data 239 can include but is not limited to a zero-demand probability score, a high-demand classification score, a raw-demand score, and a Quantile regression model. In certain embodiments, the zero-demand probability score can define a probabilistic value that a particular unforecastable supply item 112 will have zero demand. For example, the computing environment 121 can generate a binary classification recommendation based on the zero-demand probability score, where the binary classification recommendation includes a yes or no recommendation for stocking the one or more goods 111 and/or the unforecastable supply item 112 at the one or more retailers 101. In one or more embodiments, the output data 239 can include recommendations, probabilistic scores, general scores, reports, and/or any particular metric for measuring information associated with the one or more goods 111 and/or the unforecastable supply items 112.

In certain embodiments, the output data 239 can include one or more variable generated by the machine learning models. In at least one embodiment, the output data 239 can include the zero-demand probability score. In particular embodiments, the zero-demand probability score can include a real number between 0 and 1, where 0 represents a 0% likelihood that the analyzed good 111 includes zero-demand (e.g., no transactions, acquisitions, and/or hits) over a particular period of time and a 1 represents a 100% likelihood that the particular good 111 includes zero-demand over a particular period of time. In some embodiments, the output data 239 can include the high-demand classification score. In certain embodiments, the high-demand classification score can include a real number between 0 and 1, where the 0 represents a 0% likelihood that the demand of the particular good 111 will have a demand greater than 150% of a current stock mode and the 1 represents a 100% likelihood that the demand of the particular good 111 will have a demand greater than 150% of the current stock mode. In one or more embodiments, the current stock mode can represent the most common stocking number of the one or more particular goods 111 over a period of time. The current stock mode can be stored in the processed data 233. In various embodiments, the output data 239 can include the raw-demand score. In one or more embodiments, the raw-demand score can be the output from a classification model. In certain embodiments, the raw-demand score can include a demand prediction for a good 111 stocked by a particular retailer 101. For example, the raw-demand score can include a value of 32, which indicates the predicted demand of oranges on a Tuesday based on analyzed input data 231. In one or more embodiments, the raw-demand score can include a Poisson Regression model that indicates the raw-demand of the good 111 during any given period of time. In some embodiments, the output data 239 can include the Quantile regression model. In certain embodiments, the Quantile regression model can include a linear relationship between the one or more features (e.g., independent variables) and the one or more observation.

In certain embodiments, the components executed on the computing environment 121, for example, include list of applications and other applications, services, processes, systems, engines, or functionality discussed in detail herein. In particular embodiments, the computing environment 121 can include a management service 211 and a processing service 213. In some embodiments, the management service 211 and the processing service 213 can function as a centralized computing infrastructure for the computing environment 121, the retailer devices 122, the data sources 123, and/or any other system distributed across the network 105.

In at least one embodiment, the management service 211 can perform all data acquisition, data distribution, data management, and data storage procedures for the computing environment 121, the retailer device 122, the data source 123, and/or any other system distributed across the network 105. In particular embodiments, the management service 211 can distribute data within the computing environment 121. For example, the management service 211 can distribute data between the processing service 213 and the data store 215, the retailer device 122 and the data store 215, and/or between any particular system of the stock management system 200. In one or more embodiments, the management service 211 can request input data 231 from the retailer device 122 and/or the data sources 123. For example, the management service 311 can ingest input data 231 through a flat delimited file from an ERP system or client data warehouse of the retailer device 122 and/or the data source 123. In various embodiments, the management service 211 may schedule automated requests of input data 231 from any particular source on the network 105. For example, the management service 211 can request input data 231 at various time intervals (e.g., daily, weekly, monthly, quarterly, etc.). In at least one embodiment, the management service 211 can employ various scripts and/or Application Programming Interface (APIs) systems to request, receive, and/or distribute input data 231 from the systems distributed across the network 105. In certain embodiments, the management service 211 can employ Open Database Connectivity (ODBC) to facilitate input data 231 ingestion.

In particular embodiments, the processing service 213 can perform all quantitative, computing, and statistical analyses for the computing environment 121. In certain embodiments, the processing service 213 can perform machine learning analyses, statistical analyses, natural language processing analyses, report generation procedures, and/or any particular computational requirement of the computing environment 121. In particular embodiments, the processing service 213 can employ the machine learning models in the model data 237 to analyze, optimize, identify, and monitor the stocking requirements for the one or more goods 111. In one or more embodiments, the processing service 213 can train the one or more machine learning models in the model data 237 on several supply data points and various supply rules/policies to generate stocking recommendations, stocking minimums, stocking maximums, and/or supply order requests for the one or more goods 111. For example, the processing service 213 can employ the lightGBM library to train a gradient-boosting decision tree model based on various historical data points and accepted policies for handling the one or more goods 111 stored in the input data 231. Continuing this example, once trained, the processing service 213 can employ the gradient boosting decision tree model to track and optimally stock unforecastable supply items 112 for one or more retailers 101. Further continuing this example, the processing service 213 can employ the gradient boosting decision tree model to automatically implement procedures for timely replenishment of the identified unforecastable supply items 112. In some embodiments, the processing service 213 can continually train previous machine learning models stored in the model data 237 as updated input data 231 is received from the various sources distributed across the network 105. For example, the processing service 213 can train, update, and/or correct the one or more machine learning models automatically and/or continuously, as the updated input data 231 is made available to the processing service 213.

In some embodiments, the processing service 213 can process the input data 231 to generate the processed data 233. In various embodiments, the processing service 213 can process the input data 231 on scheduled time intervals (e.g., daily, weekly, monthly, etc.). In some embodiments, the processing service 213 can automatically process the input data 231 to generate the processed data 233. In one or more embodiments, the processing service 213 can calculate various metrics for each one of the one or more goods 111 based on the predictability of transaction history and/or the volume of each supply for each of the one or more goods 111. In particular embodiments, the processing service 213 can employ machine learning systems and/or statistical methods to generate the processed data 233. For example, the processing service 213 can employ statistical averaging techniques to determine one or more averaging features from the one or more features. In another example, the processing service 213 can determine the demand for a particular good 111 at a particular retailer 101 by summing all transaction data from the input data 231 for the particular good 111 over a particular period of time. In various embodiments, the processing service 213 can calculate the particular period of time for determining the demand for one or more goods 111 by calculating the sum of the particular data (e.g., MM/DD/YYYY), the lead time of the particular good 111, and a 14-day interval (i.e., the min-max cycle). In various embodiments, the processing service 213 can employ any particular period of time to determine the historical demand for one or more goods 111 at one or more retailers 101. In at least one embodiment, the processing service 213 can calculate the one or more features for each of the one or more goods 111 currently stocked by the one or more retailers 101.

In various embodiments, the processing service 213 can calculate the one or more features (also referred to herein as "metrics") from the input data 231 and store the one or more features in the processed data 233. In some embodiments, the processing service 213 can calculate the one or more features to further facilitate training the machine learning models stored in the model data 237 and establish one or more policies, as discussed in further detail herein. In particular embodiments, the processing service 213 can extract one or more features from the input data including, but not limited to, hits (i.e., transactions) and hits per month for the last 52 weeks (or other time periods); on-hand days of supply and minimum days of supply; average transaction value; and client breadth (i.e., distinct retailers 101 who bought a particular item at a particular location within a given timeframe). In some embodiments, hits, transactions, and acquisitions may be synonymous as a form of describing a single exchange of goods 111 between the retailer 101 and a client. Further, in various embodiments, the processing service 213 can calculate statistical values such as, but not limited to, minimum, maximum, mode, monthly average per good 111, etc. In some embodiments, the processing service can identify and label one or more goods 111 with less than a predefined number of hit months (e.g., 3, 8, 20, etc.). In particular embodiments and as used herein, a "hit month" refers to a month of demand history in which there was at least one transaction or "hit" for a particular good 111. In certain embodiments, the processing service 213 may identify and exclude demand anomalies, whereby demand anomalies include transactions that are "one-time" transaction in the demand history that generally should not be included in supply stocking calculations. In various embodiments, the processing service 213 can exclude demand anomalies using various methods. In at least one embodiment, the processing service 213 can recognize demand anomalies by identifying ranges of standard deviation and excluding transactions that fall outside the identified range.

In particular embodiments, the processing service 213 can identify unforecastable supply item 112 based on the predictability of transaction history and/or the volume of each unforecastable supply item 112. In at least one embodiment, to facilitate training of the machine learning data model, the processing service 213 can classify each unforecastable supply item 112 into one or more classes of unforecastable supply items 112 and store the classification in the processed data 233. In various embodiments, the one or more classes of unforecastable supply items 112 may include but are not limited to high-demand unforecastable supply items, low-volume unforecastable supply items, and zero-demand unforecastable supply items.

In certain embodiments, the processing service 213 may provide a recommended stocking rule or supply policy for each identified unforecastable supply item 112. In one embodiment, the processing service 213 may create the stocking rule or supply policy based on the input data 231. In particular embodiments, the processing service 213 may automatically generate the stocking rule or supply policy. In one or more embodiments and as used herein, the stocking rule or supply policy refers to a plan of action for one or more goods 111 that have met particular conditions. For example, the processing service 213 can generate a particular stocking rule to remove the goods 111 that have no transactions in the last twelve months from future stocking orders made to the manufacturer 103 by switching the stocking status of the goods 111 from "stock" to "nonstock." In another example, the processing service 213 can generate a second stocking rule to keep stocking various goods 111 with only three hits in the last twelve months, but that typically sells to a top client of the retailer 101 and does not have an average value of over $50. In yet another example, the processing service 213 can generate a third stocking rule to stock at least 5 units of a particular good 111 with less than ten hits in the last twelve months but with transactions to at least five different clients in the same time period. In yet another example, the processing service 213 can generate a fourth stocking rule to stock five units of a particular good 111 only if a particular client has acquired the particular good 111 in the past ninety days; otherwise, stock two units of the particular good 111. In particular embodiments, the processing service 213 stores each stocking rule in the output data 239 or at any other location in the data store 215.

In various embodiments, the processing service 213 may employ one or more machine learning methodologies from the model data 237 to evaluate the output (e.g., Min/Maxes, stocking recommendations, etc.) against actual transactions of the one or more goods 111 and to recommend policy changes accordingly. In certain embodiments, the processing service 213 may run simulations of estimated supply, lost transactions, and other metrics, based on one or more supply policies.

In some embodiments, the processing service 213 may train a machine learning model from the model data 237 to identify unforecastable supply items 112 with zero transactions in the last twelve months but are currently classified as an "active" stocked item. For example, the processing service 213 can employ the LightGBM library to produce a binary classification that generates the zero-demand probability score, where the zero-demand probability score illustrates the likelihood that the unforecastable supply item 112 has zero demand. In particular embodiments, on identifying the unforecastable supply items 112 with a zero-demand probability score above an example 60%, the processing service 213 can establish a policy to set the minimum stock value or Order Point to zero for these unforecastable supply items 112. In another example, the processing service 213 can change the status of these unforecastable supply items 112 from "active" to "inactive" in the ERP system of the retailer devices 122 and/or the data sources 123. In certain embodiments, the processing service 213 may automate policy implementation by generating output data 239 for ingestion into the ERP system of the retailer devices 122 and/or the data sources 123. Note that the above examples are not intended to limit the scope of the disclosure.

In some embodiments, the processing service 213 may train the machine learning models from the model data 237 to establish a particular supply policy for goods 111 with greater than zero but less than a predefined number of transactions per month (e.g., 4, 12, 25, etc.). In at least one embodiment, the processing service 213 may be configured to generate the particular supply policy to include one unit of the identified goods 111 stocked at the retailer 101. In one or more embodiments, the processing service 213 can stock the most common increment that is sold for the particular goods 111. In various embodiments, the processing service 213 may analyze the impact between supply investment and lost transactions to arrive at a preferred recommendation. For example, the processing service 213 can extract one or more features from the input data 231 that track the monetary value of supply investments and lost transactions. Continuing this example, the processing service 213 can run the monetary value of the supply investments and lost transactions for the one or more goods 111 through a particular machine learning model to generate a stocking recommendation. In certain embodiments, supply investment analyses performed by the processing service 213 may include the analysis of carrying expenses, unit value, insurance, government expenses, and obsolescence. In some embodiments, an analysis of lost transactions by the processing service 213 may include monitoring the number of days where the one or more goods 111 on-hand at the retailer 101 were projected to be zero, but transactions were ultimately anticipated.

In particular embodiments, the processing service 213 may train one or more of the machine learning models from the model data 237 to establish a policy for goods 111 with greater than a predefined number of transactions per month (e.g., 4, 9, 15, etc.) but less than a second predefined number of transactions per month (e.g., 25, 35, 50, etc.). In certain embodiments, the processing service 213 may be configured to stock the most common transactions increment of the identified good 111. In some embodiments, the processing service 213 may be configured to stock the highest quantity sold to a single client over the last twelve months. In various embodiments, the processing service 213 may analyze the impact between supply investment and lost transactions to arrive at a preferred recommendation.

In some embodiments, the processing service 213 may train the model to establish a policy based on user-defined criteria. In some embodiments, the processing service 213 may receive user-defined rules for stocking the one or more goods from the retailer device 122. In certain embodiments, the retailer device 122 can generate rules for stocking based on predefined Stocking Rule Templates. In various embodiments, the processing service 213 may receive a set of rules that are structured as queries. In particular embodiments, example rules may include: if at least three clients acquired the particular good 111 at this particular retailer 101 over the last twelve months, then stock the average transaction amount; if at least one client has acquired one unit of the good 111 at the particular retailer 101, then stock one unit of the good 111 at the particular retailer 101 even if there are no independent transactions at the particular retailer 101; or if one of the top ten clients of the retailer 101 buys at least one unit over the last year of a particular good 111 at a particular retailer 101 location, then stock at least one unit of the particular good 111 at that particular retailer 101 location. As will be understood and appreciated, other policies and rules may be established based on specific data sets analyzed by the processing service 213; the policies and rules identified above are provided for illustrative and exemplary purposes only and are not intended to limit the scope of the present disclosure.

In particular embodiments, the stock management system 200 can include the retailer devices 122 and the data sources 123. In certain embodiments, the retailer device 122 and the data sources 123 can be substantially similar. For example, the retailer device 122 and the data sources 123 can be incorporated into one system and function substantially similarly as the two independent components.

In some embodiments, the one or more retailer devices 122 can include any particular computer, computer bank, server system, plurality of computers, or computing system located and the retailer 101. In particular embodiments, the retailer device 122 can function as a data distribution system and data aggregation system for the retailer 101. In at least one embodiment, the retailer 101 can include one or more retailer devices 122. For example, if the retailer 101 is a large chain grocery store with over 100 locations internationally, a particular retailer device 122 may be located at each particular location of the retailer 101. In particular embodiments, the retailer device 122 can include inputs 217, a display 219, and a data store 221.

In some embodiments, the inputs 217 of the retailer devices 122 can include devices used to gather information associated with the retailer 101. For example, the inputs 217 can include but are not limited to a keyboard, a mouse, one or more cameras, transaction systems at the retailer 101, and commercial instruments. In various embodiments, the inputs 217 can receive fiscal data associated with the transaction of one or more goods 111 stocked at the retailer 101.

In particular embodiments, the display 219 can include any particular display for rendering information at the retailer device 122. In various embodiments, the display 219 can include, for example, one or more devices such as liquid crystal display ("LCD") displays, gas plasma-based flat panel displays, organic light emitting diode ("OLED") displays, electrophoretic ink ("E ink") displays, LCD projectors, or other types of display devices, etc. In particular embodiments, the display 219 can render output data 239 received by the computing environment 121. For example, the computing environment 121 can generate a report listing the top ten unforecastable supply items 112 for the last three months. Continuing this example, the computing environment 121 can send the report to the retailer device 122 for rendering on the display 219.

In particular embodiments, the data store 221 can function as a data storage system for the retailer devices 122. In some embodiments, the data store 221 can include all fiscal data, stock data, transaction data, acquiring data, and/or any particular data associated with the one or more goods 111 stocked and sold by the retailer 101. In certain embodiments, the data store 221 can function substantially similarly to the data store 215. In one or more embodiments, the data store 221 can function as an extension of the data store 215. For example, the data store 221 can function as a remote data server for the data store 215. In particular embodiments, the data store 221 can include a subset of data stored and distributed by the data sources 123.

In at least one embodiment, the data sources 123 can include any particular data source associated with the manufacturer 103, any third-party data source, or a combination thereof. For example, the data sources 123 can include valuation data, transaction data, and wholesale distribution data for one or more goods 111 sold by the one or more manufacturers 103. In another non-limiting example, the data sources 123 can include publically or privately accessible data associated with the transaction of one or more goods 111.

Figure 3:
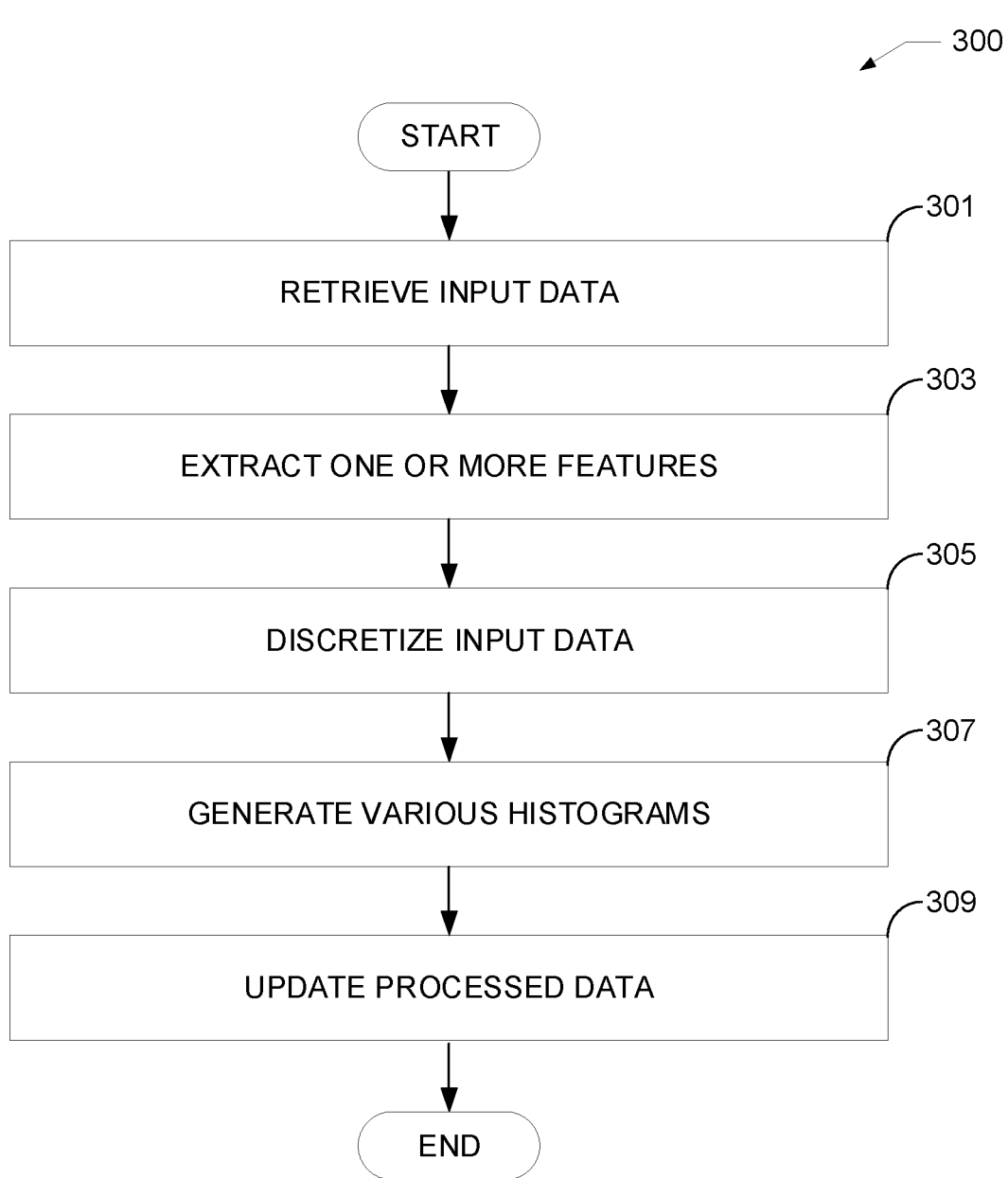
FIG. 3 illustrates a flowchart of a process for an example data processing technique, according to one embodiment of the present disclosure.

Referring now to FIG. 3, illustrated is a flowchart of a process 300 for an example data processing technique, according to one embodiment of the present disclosure. In certain embodiments, the process 300 can demonstrate a technique for processing the input data 231 to generate the processed data 233. In various embodiments, the processing service 213 can initiate the process 300 to generate processed data 233 from the input data 231.

At box 301, the process 300 can include receiving input data 231, according to one embodiment of the present disclosure. In certain embodiments, the computing environment 121 can receive input data 231 from the retailer devices 122, the data sources 123, and/or any particular source distributed across the network 105. In one or more embodiments, the management service 211 can employ one or more API systems to extract input data 231 from the retailer devices 122 and/or the data sources 123. The management service 211, in at least one embodiment, can constantly request input data 231 through the API systems such that the computing environment 121 has a real-time view of the input data 231. In some embodiments, the management service 211 requests data periodically (e.g., hourly, daily, weekly, bi-weekly, monthly, quarterly, etc.).

In one non-limiting example, the computing environment 121 can receive input data 231 from the retailer device 122 associated with an auto-parts distributor. In certain embodiments, the input data 231 can include a tabular file with 1,310,000 observation data entries over a seven month period. In particular embodiments, the observation data entries can include columns that each delimitate the good number, the client name, the client location, the supply of the particular good, the time the goods were sold, the quantity of goods sold, and the value of the good. In at least one embodiment, the observation data entries can each represent one transaction performed by the auto-parts distributor over the seven month period.

At box 303, the process 300 can include extracting one or more features, according to one embodiment of the present disclosure. In various embodiments, the processing service 213 can extract the one or more features from the input data 231. In certain embodiments, the one or more features can represent various measurable attributes associated with the one or more goods 111. In a non-limiting example, various demands measured over a 12 month period, a 6 month period, a 3 month period, and a one month period for a particular good 111 sold at a particular retailer 101 can each be considered an individual feature associated with the particular good 111. In particular embodiments, the processing service 213 can employ various statistical techniques to extract various features from the input data 231. For example, the processing service 213 can employ the various statistical techniques, such as minimum calculations, maximum calculations, modes, monthly averages, weekly averages, yearly averages, quarterly averages, and/or any particular statistical inference from the input data 231. In some embodiments, the processing service 213 can calculate various fiscal features associated with the one or more goods 111. For example, the processing service 213 can determine known demand for various periods, maximum demands, transaction information, discount information, and/or any particular fiscal related information associated with the one or more goods 111. In particular embodiments, the processing service 213 can extract from the input data 231 average lead time for one or more goods 111, demand mode for various goods 111, applicable maximums and minimums for various goods 111, number of historical orders for various goods 111, and restocking request for one or more goods 111.

In one non-limiting example, the processing service 213 can extract one or more features from the input data 231 associated with the auto-parts distributor. In at least one embodiment, the processing service 213 can extract one or more features from the 1,310,000 observation data entries of the tabular file received by the retailer device 122. For example, the processing service 213 can recognize from the input data 231 that an all-weather tire has sold twice over the last seven months. In various embodiments, the processing service 213 can store the acquiring information of the all-weather tire as a feature in the processed data 233. In another example, the processing service 213 can generate an average transaction volume per acquisition for a Doyota Samry spark plug based on the input data 231. Continuing this example, the processing service 213 can store the average transaction volume per acquisition of the Doyota Samry spark plug as a feature of the input data 231.

At box 305, in particular embodiments, the process 300 can include discretizing the input data 231 and/or the one or more features, according to one embodiment of the present disclosure. In various embodiments, discretizing the input data 231 can be a technique for optimizing machine learning systems using gradient boosting algorithms and/or similar algorithms. For example, a gradient boosting algorithm may incur dramatically large processing times when the input data 231 is larger than 1000 values. In some embodiments, to reduce the processing times, the input data 231 is subdivided (or discretized) into one or more bins. In these embodiments (and others), the bins may represent numerically similar values combined into various discrete measurable bins. In particular embodiments, by combining the inputs into various bins, the 1000 values for processing by the machine learning model may drop to 100 or less. In certain embodiments, the processing service 213 may combine the input data 231 into various bins, where each bin includes statistically similar values.

At box 307, the process 300 can include generating various histograms of the input data 231 and/or the one or more features, according to one embodiment of the present disclosure. In certain embodiments, the LightGBM library can include a histogram-based gradient-boosting algorithm. In particular embodiments, the histogram-based gradient boosting algorithm of the LightBGM library takes in one or more histograms of the input data 231 for processing and analyses. In at least one embodiments, the processing service 213 can generate various histograms of the input data 231, the one or more features, and/or the various bins for processing by the histogram-based gradient boosting algorithm stored in the model data 237.

At box 309, the process 300 can include updating the processed data 233, according to one embodiment of the present disclosure. In some embodiments, the processed data 233 is updated to include the one or more features, the discretized bins of the input data 231, and the histograms of the input data 231. In at least one embodiment, the processing service 213 can employ the management service 211 to store the processed data 233 in the data store 215.

Figure 4:
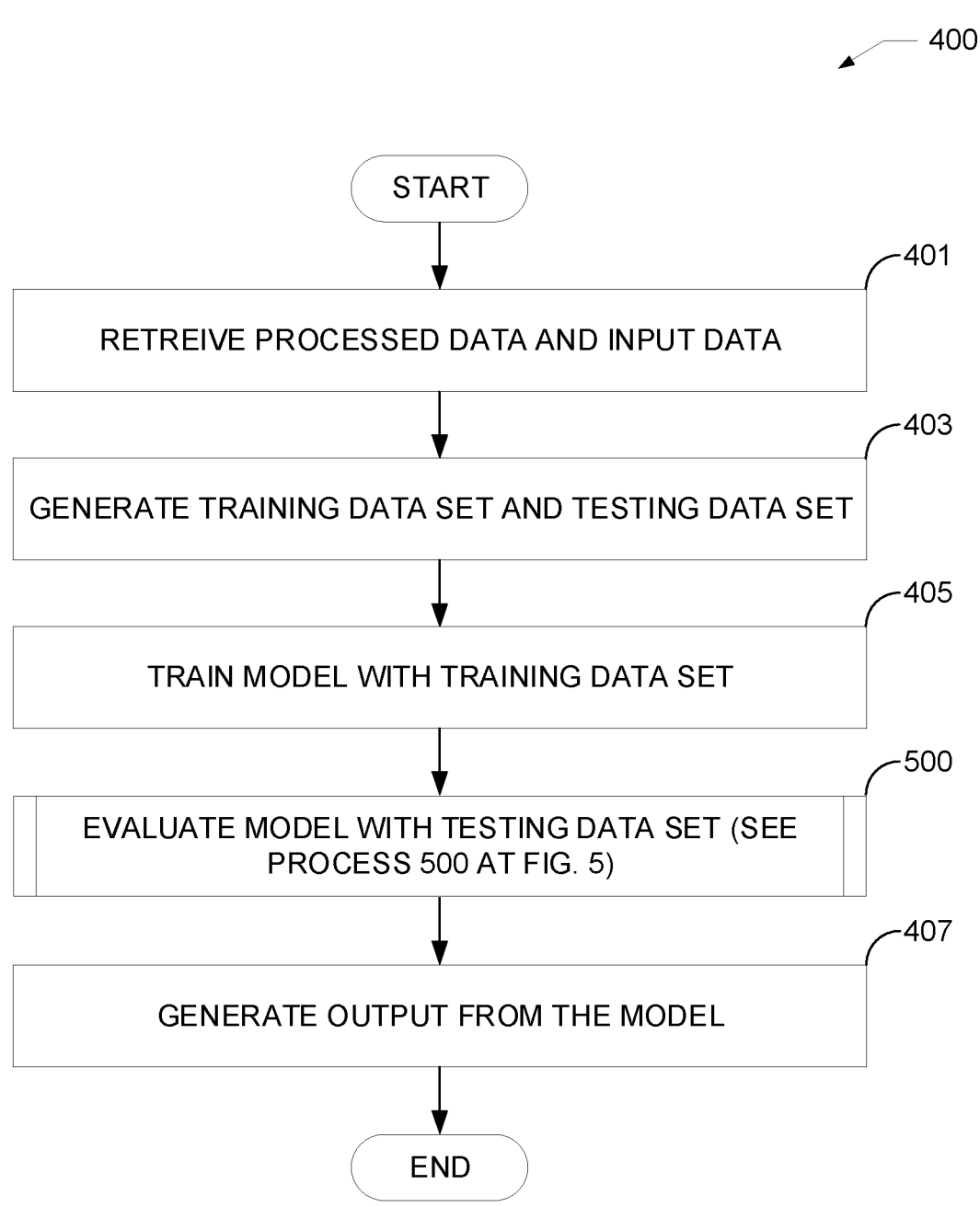
FIG. 4 illustrates a flowchart of a process for generating a first machine learning model, according to one embodiment of the present disclosure.

Referring now to FIG. 4, illustrated is a flowchart of a process 400 for generating a first machine learning model, according to one embodiment of the present disclosure. In at least one embodiment, the process 400 demonstrates a technique for applying one or more machine learning models to a training data set and a testing data set to generate a stocking analysis associated with one or more goods 111. In particular embodiments, the computing environment 121 can employ the process 400 to apply various sets of training and testing data 235 to distinct models to generate various types of outcomes. In various embodiments, and as discussed in further detail herein, the processing service 213 employs the process 400 to generate the zero-demand probability score, the high-demand classification score, the raw-demand classification score, and the Quantile regression model. Although discussed in the context of the zero-demand probability score, the high-demand classification score, the raw-demand classification score, and the Quantile regression model and the particular model that generate these outputs, in some embodiments, the processing service 213 can employ the process 400 with any particular data input and any particular model type to generate various other types of outputs than realized herein.

At box 401, the process 400 can include extracting the processed data 233 and the input data 231, according to one embodiment of the present disclosure. In various embodiments, the processing service 213 can employ the management service 211 to extract the processed data 233 and the input data 231 from the data store 215.

At box 403, the process 400 can include generating training and testing data 235, according to one embodiment of the present disclosure. In certain embodiments, the processing service 213 can generate a training data set and a testing data set. In particular embodiments, the testing data set and the training data set can be stored in the training and testing data 235. In various embodiments, the processing service 213 can generate the training data set by randomly aggregated 80% of the input data 231 and the processed data 233. In one or more embodiments, the processing service 213 can generate the testing data set by randomly aggregated 20% of the input data 231 and the processed data 233, where the training data set and the testing data set are mutually exclusive. In one or more embodiments, the testing data set and the training data set include different percentage breakdowns in sizes (e.g., 10%, 40%, 60%, 90%, etc.).

At box 405, the process 400 can include training the machine learning model with the training data set, according to one embodiment of the present disclosure. In various embodiments, the processing service 213 can train the selected machine learning model on the training data set. In certain embodiments, the processing service 213 can choose the appropriate machine learning system for the particular output. For example, the processing service 213 can employ the LightGBM library and select the binary classification algorithm using the gradient boosting decision tree algorithm to generate the zero-demand probability score. In particular embodiments, the processing service 213 can select other types of acceptable models and algorithms for training to generate the zero-demand probability score. For example, the processing service 213 can employ a Naive Bayes algorithm, logistic regression algorithms, K-nearest neighbors algorithm, support vector machine algorithms, neural network algorithms, random forest algorithms, and/or any pertinent algorithm.

Figure 5:
FIG. 5 illustrates a flowchart of a process for evaluating one or more of the machine learning models, according to one embodiment of the present disclosure.
Figure 5:
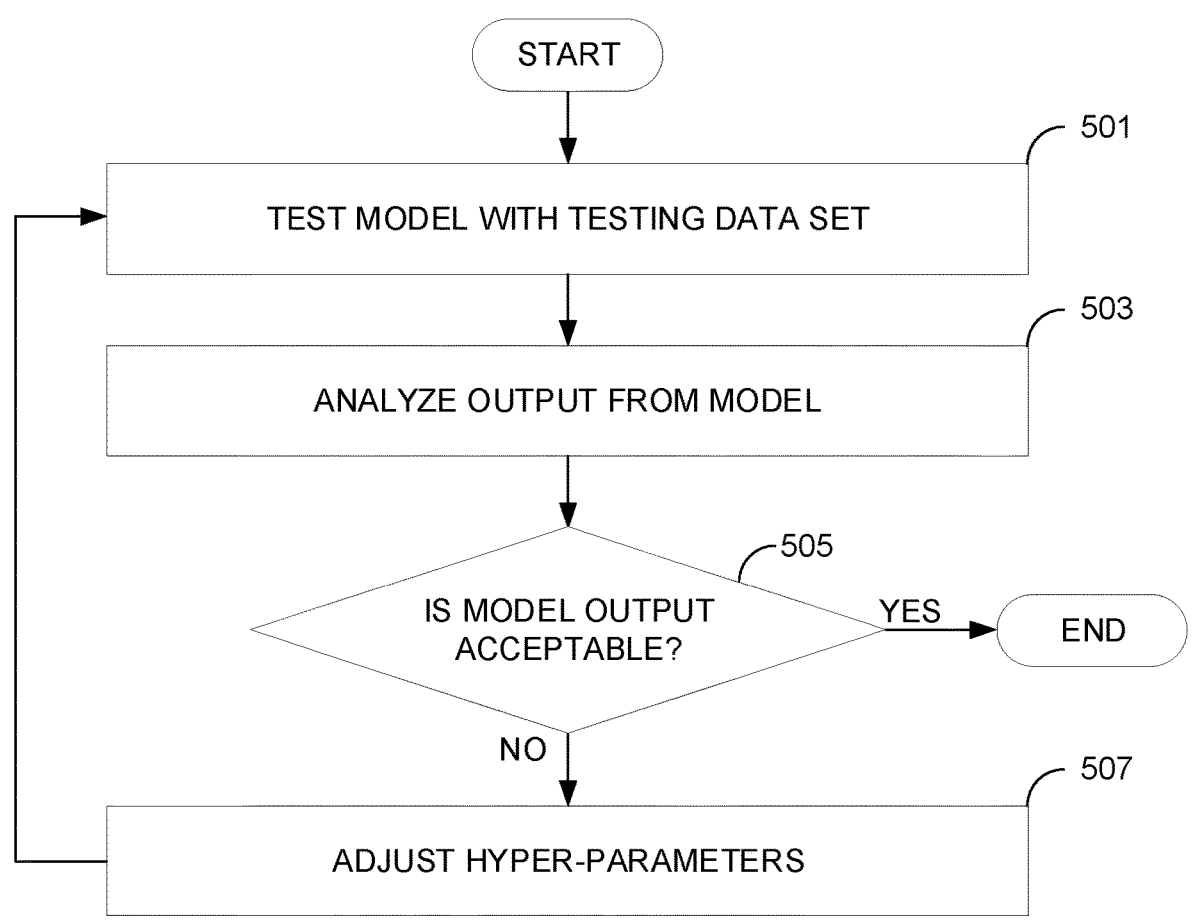

At a process 500, the process 400 can include a subroutine for evaluating the machine learning model with the testing data set, according to one embodiment of the present disclosure (see FIG. 5 for further details). In certain embodiments, the processing service 213 can evaluate the machine learning model with the testing data set. In some embodiments, the processing service 213 can analyze the output from the machine learning model to determine the success and/or accuracy of the particular output of the machine learning model. For example, the processing service 213 can perform Area Under the Receiver Operating Characteristics (AUROC) curve analyses, K-Fold Cross-Validation, random subsampling, bootstrapping, resubstitution, and/or any applicable validation technique. In at least one embodiment, based on the outcome of the validation, the processing service 213 can adjust hyper-parameters of the machine learning model to improve the output quality of the model. For example, the processing service 213 can adjust the number of boosting rounds, the decision tree depth, the learning rate, the minimum data per decision tree leaf, the feature fraction value, and/or the number of leaves for the decision trees to adjust the model. In particular embodiments, the processing service 213 can rerun the model with updated hyper-parameters evaluated with the training and testing data 235. In some embodiments, the processing service 213 can continually evaluate the machine learning model until an optimal and desired output is generated.

At box 407, the process 400 can include generating an output from the machine learning model, according to one embodiment of the present disclosure. In some embodiments, the processing service 213 can generate the output from the machine learning model. For example, the processing service 213 can generate the zero-demand probability score based on the output from the binary classification algorithm. In some embodiments, the processing service 213 can employ the output from the machine learning model to create various recommendations, stocking analyses, and/or decisions associated with the one or more goods.

In one or more embodiments, the processing service 213 can reuse the process 400 to generate different output from distinct machine learning models. For example, the processing service 213 can store the zero-demand probability score with the processed data 233. Continuing this example, the processing service 213 can regenerate a second set of training and testing data 235 from the input data 231 and the processed data 233, where the processed data 233 now includes the zero-demand probability score. Further continuing this example, the processing service 213 can train and evaluate a classification algorithm with the second set of training and testing data 235 using the LightGBM library to generate the high-demand classification score.

In another non-limiting example, the processing service 213 can store the zero-demand probability score and the high-demand classification score with the processed data 233. Continuing this example, the processing service 213 can regenerate a third set of training and testing data 235 from the input data 231 and the processed data 233, where the processed data 233 now includes the zero-demand probability score and the high-demand classification score. Further continuing this example, the processing service 213 can train and evaluate a classification algorithm with the third set of training and testing data 235 using the Light-GBM library to generate the raw-demand classification score.

In yet another example, the processing service 213 can store the zero-demand probability score, the high-demand classification score, and the raw-demand classification score with the processed data 233. Continuing this example, the processing service 213 can regenerate a fourth set of training and testing data 235 from the input data 231 and the processed data 233, where the processed data 233 now includes the zero-demand probability score, the high-demand classification score, and the raw-demand classification score. Further continuing this example, the processing service 213 can train and evaluate a classification algorithm with the fourth set of training and testing data 235 using the LightGBM library to generate the Quantile regression model.

Referring now to FIG. 5, illustrated is a flowchart of the process 500, according to one embodiment of the present disclosure. In certain embodiments, the process 500 demonstrates a technique for evaluating the output of the one or more machine learning models generated by the processing service 213. In some embodiments, the processing service 213 can perform the process 500 on one or more machine learning model outputs.

At box 501, the process 500 includes testing the machine learning model with the testing data set, according to one embodiment of the present disclosure. In various embodiments, the processing service 213 can test the machine learning model with the testing data set from the training and testing data 235. In some embodiments, the management service 211 can save the results of the machine learning model in the data store 215 on completion of the test.

At box 503, the process 500 can include analyzing the output generated by the machine learning model, according to one embodiment of the present disclosure. In various embodiments, the processing service 213 can analyze the output generated by the machine learning model to determine the success of the machine learning model. In certain embodiments, the processing service 213 can include various validation techniques to test the ability of the machine learning models. In some embodiments, the processing service 213 can generate one or more validation scores using the various validation techniques. For example, the various validation techniques can include but are not limited to Train/test split, k-Fold Cross-Validation, Leave-one-out Cross-Validation, Leave-one-group-out Cross-Validation, Nested Cross-Validation, Time-series Cross-Validation, Wilcoxon signed-rank test, McNemar's test, 5x2CV paired t-test, 5x2CV combined F test, and area under the receiver operating characteristic (AUROC) curve. In certain embodiments, the processing service 213 can generate a first receiver operating characteristic (ROC) curve for the machine learning model after processing the testing data and a second ROC curve for the machine learning model after processing the training data. In one or more embodiments, the processing service 213 can generate a first validation score and second validation score by calculating the area under the first ROC curve and the second ROC curve, respectively. In some embodiments, an area (e.g., AUROC curve) of 1 under the first and second ROC curves indicates a perfect model. In particular embodiments, an area (e.g., AUROC curve) of 0.5 under the first and second ROC curves indicates a model that produces outcomes equally as good as guessing. In certain embodiments, each of the various validation techniques may generate various validation scores for further process.

At box 505, the process 500 can include a decision evaluating if the model has an acceptable output, according to one embodiment of the present disclosure. In some embodiments, the processing service 213 may determine that the model has an acceptable output. In certain embodiments, the processing service 213 can analyze the outputs of the various validation techniques to determine if the model is generating correct outputs. In certain embodiments, the processing service 213 may include a validation score threshold, where if reached, the model is deemed adequate and ready for deployment. For example, the validation score threshold may equal an AUROC value of 0.8, 0.8-10, 0.81, 0.8-0.9, 0.9, 0.9-1.0, or less than 1.0. Continuing this example, a validation score including an AUROC value of 0.75 would fall below the validation score threshold. In one or more embodiments, if the one or more validation scores of the various validation techniques are higher than the one or more validation score thresholds, the processing service 213 can continue to box deployment of the machine learning model (e.g., "END" in the process 500). In some embodiments, if the outputs of the various validation techniques are less than the validation score threshold, the processing service 213 can continue to box 507.

At box 507, the process 500 can include adjusting one or more hyper-parameters, according to one embodiment of the present disclosure. In certain embodiments, the processing service 213 can adjust one or more hyper-parameters. In at least one embodiment, the processing service 213 can adjust the one or more hyper-parameters to attempt and increase the measured validity (e.g., AUROC curve) of the one or more machine learning models. For example, the processing service 213 can adjust the number of boosting rounds, the decision tree depth, the learning rate, the minimum data per decision tree leaf, the feature fraction value, and/or the number of leaves for the decision trees to adjust the model. In various embodiments, the processing service 213 can proceed to box 501 on adjusting the hyper-parameters of the machine learning model.

Figure 6:
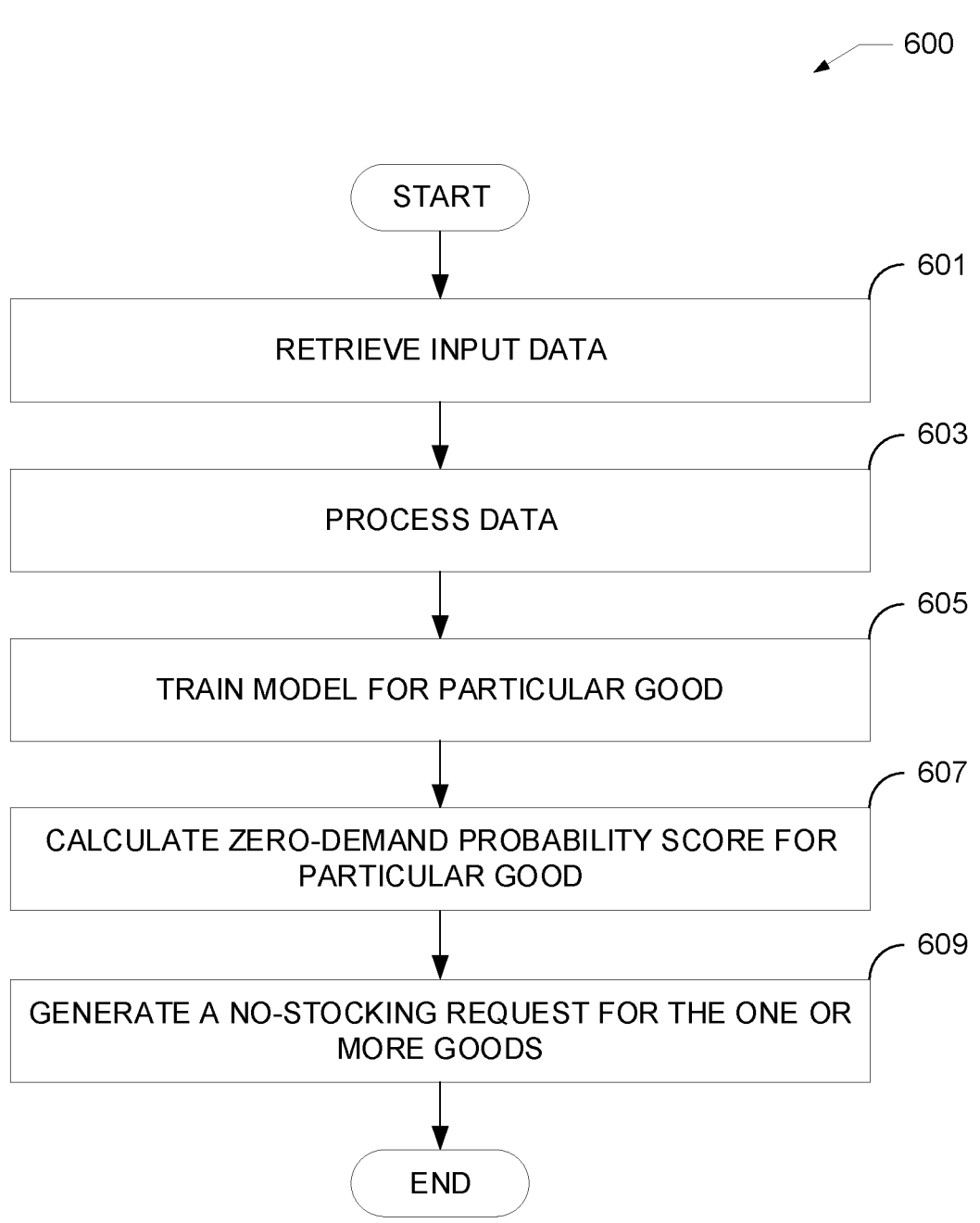
FIG. 6 illustrates a flowchart of a process for an example use case scenario of the supply management system, according to one embodiment of the present disclosure.

Referring now to FIG. 6, illustrated is a flowchart of a process 600 for an example use case scenario of the supply management system, according to one embodiment of the present disclosure. In some embodiments, the process 600 can demonstrate a technique for employing the stock management system 200 to adjust the stock values for one or more goods 111.

At box 601, the process 600 can include receiving input data 231 from the API system, according to one embodiment of the present disclosure. In some embodiments, the computing environment 121 requests input data 231 from the retailer devices 122, the data sources 123, and/or any particular service distributed across the network 105. In particular embodiments, the box 601 can function substantially similarly to the box 301 from the process 300.

At box 603, the process 600 can include processing the input data 231, according to one embodiment of the present disclosure. In various embodiments, the processing service 213 can generate the processed data 233 by processing the input data 231. In some embodiments, the box 603 can function substantially similarly to the boxes 303, 305, 307 and 309 of process 300.

At boxes 605 and 607, the process 600 can include training the machine learning model and calculating a zero-demand probability score for the particular good 111, according to one embodiment of the present disclosure. In at last one embodiment, the processing service can train the machine learning model and calculate a zero-demand probability score for the particular good 111. In some embodiments, the boxes 605 and 607 can function substantially similarly to the boxes 403, 405, process 500, and box 407 of process 400.

At box 609, the process 600 can include generating a no-stocking request for the one or more goods 111, according to one embodiment of the present disclosure. In particular embodiments, the processing service 213 can generate a no stocking request for the particular good 111 based on the zero-demand probability score. For example, the processing service 213 may determine that the zero-demand probability score for the particular good is 85% for the next 7 months. Continuing this example, the zero-demand probability score indicates that the processing service 213 predicts that the particular good 111 will have an 85% chance of having 0 transactions over the next 7 months. In some embodiments, the processing service 213, in response to identifying the high probability (e.g., greater than 70%) of 0 transactions over the next seven months, can generate a stocking policy including a no-stocking request for 7 months for the particular good 111. In at least one embodiment, the no-stocking request can limit stocking request to the manufacturer 103. By reducing the stocking request from the manufacturer, the processing service 213 can reduce the dead supply present at the retailer 101 and reduce lost expenses associated with this scenario. In particular embodiments, the processing service 213 can generate various different requests and/or outputs based on the analyses performed. For example, the processing service 213 can generate a minimum stocking request based on the raw-demand classification score generated by the Poisson regression algorithm of the LightGBM library stored in the model data 237. In certain embodiments, the minimum stocking request for the one or more goods 111 may allow the processing service 213 to automatically order new stock from the manufacturers 103 when a stock for one or more goods 111 falls below the raw demand classification score.

Figure 7:
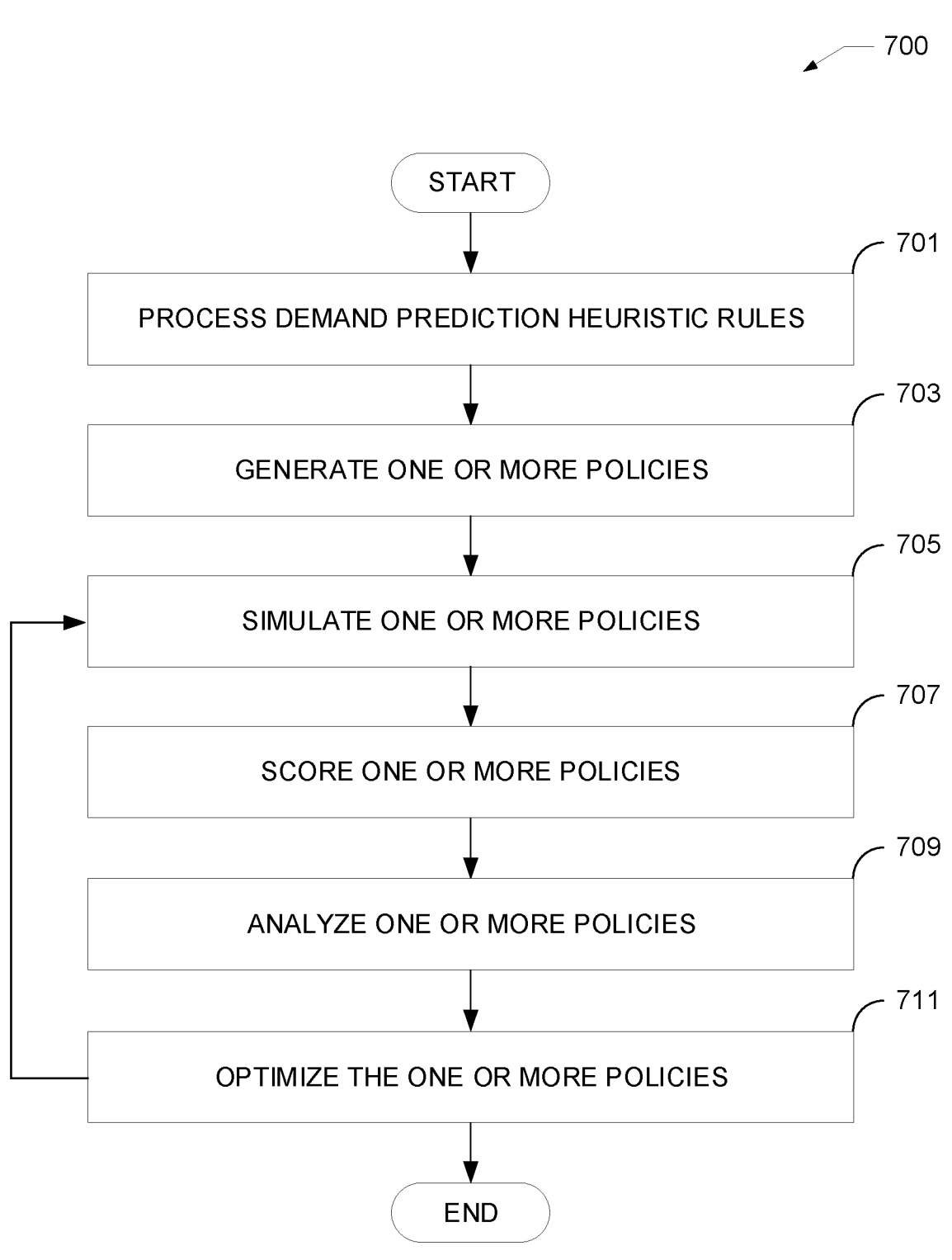
FIG. 7 illustrates a flowchart of a process for generating, analyzing, and optimizing a policy, according to one embodiment of the present disclosure

Referring now to FIG. 7, illustrated is a flowchart of a process 700 for generating, analyzing, and optimizing a policy, according to one embodiment of the present disclosure. In certain embodiments, the process 700 can describe a technique for generating, evaluating, and optimizing one or more policies for various goods 111 stocked by the retailer 101. In some embodiments, the process 700 can be performed by the processing service 213 to generate various policies for stocking one or more goods associated with the goods 111.

At box 701, the process 700 can include processing demand prediction heuristic rules, according to one embodiment of the present disclosure. In some embodiments, the processing service can process demand prediction heuristic rules associated with the one or more goods 111 stocked at a retailer 101. In various embodiments, the processing service 213 can generate one or more demand prediction heuristic rules to govern one or more heuristic algorithms. For example, the processing service 213 can select the average demand over the last 12 months, the average demand over the last 6 months, the average demand over the last 3 months, and the average number of items sold per transaction and store the variables as the demand prediction heuristic rules. In certain embodiments, the processing service 213 can process the one or more demand prediction heuristic rules through one or more heuristic models to determine various policies for the one or more goods 111. In some embodiments, the management service 211 may receive one or more demand prediction heuristic rules from the retailer device 122. For example, a user may generate the demand prediction heuristic rule though the inputs 217 of the retailer device 122. Continuing this example, the processing service 213 may augment the received demand prediction heuristic rule by adding various other variables to the received demand prediction heuristic rule. In some embodiments, the processing service 213 may employ various scoring techniques to score the heuristic algorithms against the demand prediction heuristic rules. For example, the processing service 213 can employ one or more machine learning models from the model data 237 to generate a heuristic score that measures the heuristic algorithms ability to correctly predict the demand for a good 111 over the next six months. In one or more embodiments, the processing service 213 may generate more than one heuristic score to evaluate various aspects of the heuristic algorithms and/or the demand prediction heuristic rules.

At box 703, the process 700 can include generating one or more policies, according to one embodiment of the present disclosure. In at least one embodiment, the processing service 213 can generate one or more policies for controlling the stocking rules of the one or more goods sold by the one or more retailers. In some embodiments, the processing service 213 can employ the input data 231, the processed data 233, and/or the output data 239 to generate one or more policies associated with the stocking rules of the one or more goods 111. For example, the processing service 213 may employ the demand prediction heuristic rules for the policies on determining that the heuristic score for the particular good satisfies fiscal metrics analyzed by the processing service 213. In various embodiments, the processing service 213 may employ the output data 239 to generate one or more policies for one or more goods 111. For example, the processing service 213 may compare the zero-demand probability score to a demand prediction heuristic rule for a particular good 111. Continuing this example, the processing service 213 may determine that the zero-demand probability score more accurately predicts the likelihood that there will be zero demand for the particular good 111 over the next 12 months. Further continuing this example, the processing service 213 may employ the zero-demand probability score to generate a zero-demand request within the particular policy associated with the particular good 111.

At box 705, the process 700 can include simulating one or more policies, according to one embodiment of the present disclosure. In various embodiments, the processing service 213 can simulate the one or more policies to evaluate the policies ability to maximize transactions and minimize expenses associated with the one or more goods 111. For example, the processing service 213 can employ one or more machine learning models from the model data 237 to simulate a particular policy associated with a particular good over a six month period. Continuing this example, the simulation may include predicted transactions for the particular good based off of historical transaction data associated with the particular good. Further continuing this example, the processing service 213 can evaluate the particular policy within the simulation to determine the policies ability to maintain optimal stock over the six month period. In one or more embodiments, the processing service 213 may generate one or more simulation scores that rank the policies ability to properly maintain stock levels while maximizing transactions and minimizing expenses.

At box 707, the process 700 can include scoring the one or more policies, according to one embodiment of the present disclosure. In certain embodiments, the processing service 213 can score the one or more policies to evaluate the policies ability to maximize transactions and minimize expenses. For example, the processing service 213 may employ cost models to evaluate the one or more policies against a profitability equation. Continuing this example, the processing service 213 can employ the techniques of the process 500 to evaluate the one or more policies of the one or more goods 111. In some embodiments, the processing service 213 may analyze policies and their corresponding performance to determine anomalies, errors, and other issues associated with the policies. For example, the processing service may analyze one or more scores by calculating various standard deviations to determine outlier scores and/or erroneous scores associated with the one or more policies.

In one or more embodiments, the processing service 213 can generate one or more simulation scores associated with the policy and its performance during the simulation. In particular embodiments, the one or more simulation scores can include but are not limited to an average period service level value, an average weekly on-hand value, an average weekly transaction value, an average weekly lost transaction value, an average twelve month demand value, and an average twelve month overstock value. In certain embodiments, the average period service level value may define a probability that represents the likelihood that the retailer 101 will not have sufficient supply of a particular good 111 to meet demand over a particular period of time. For example, the processing service 213 can generate an average period service level value of 81.55% for the simulated policy. Continuing this example, the 81.55% average period service level value illustrates that the simulated policy influenced an 81.55% likelihood that the retailer will have sufficient supply to satisfy demand. In some embodiments, the average weekly on-hand value may represent the current supply for the particular good 111 at the particular retailer 101 as measured in a particular currency. For example, a particular retailer may have an average of ten four-pack 9V batteries in stock, each valued at 15 dollars. In at least one embodiment, the processing service 213 may generate an average weekly on-hand value of 150 dollars for the retailer stocking the 10 four-pack 9V batteries. In some embodiments, the average weekly transaction value may represent a monetary value for transactions of the good 111 at the retailer 101 averaged over various weeks. In certain embodiments, the average weekly lost transaction value may represent a monetary value for lost transactions of the good 111 stocked by the retailer 101 averaged over various weeks. In particular embodiments, the average twelve month demand value may define an average value of demand for the good 111 stocked by the retailer 101 over the course of twelve months. In some embodiments, the average twelve month overstock value may represent a monetary value for the excess amount of supply over the twelve month period. In various embodiments, the processing service 213 may analyze the simulation in real time and generate updated simulation scores.

In some embodiments, the processing service 213 may assign weights to each of the simulation scores based on their influence on one or more machine learning algorithms and/or the simulation. For example, the average twelve month overstock value may be assigned a weight twice that of the remaining simulation scores. In some embodiments, the processing service may input the weights into a machine learning optimization algorithm and/or any particular optimization algorithm when optimizing the policy associated with the simulation scores. In some embodiments, the processing service 213 may combine one or more scores to generate an overall simulation score for the particular policy. In certain embodiments, the processing service 213 may save one or more overall simulation scores to compare and contrast changes made to a particular policy. For example, the processing service 213 may track the overall simulation score to insure the simulated policy is improving over each iterative optimization. In particular embodiments, the processing service 213 may take in consideration the weights of each simulated score when generating the overall simulation score. For example, the processing service 213 can apply the weights to the simulation scores prior to averaging to generate the overall simulation score.

At box 709, the process 700 can include analyzing the one or more policies, according to one embodiment of the present disclosure. In various embodiments, the processing service 213 can analyze the one or more policies. In some embodiments, the processing service 213 may employ normal distributions to plot the simulation scores for each of the one or more policies. In particular embodiments, the processing service 213 may employ the normal distribution to identify simulation scores that are outliers. For example, the processing service 213 may identify simulation scores that are within a particular range of the normal distribution. Continuing this non-limiting example, the processing service 213 can define the particular range as anything above a $75^{th}$ percentile and/or anything below a $25^{th}$ percentile. Further continuing this example, the processing service 213 may label any simulation scores, policies, and/or analyzed data that falls within the particular range as outlier data. In some embodiments, the processing service 213 can analyze the one or more policies by comparing policies. For example, the processing service 213 can compare different policies for similar goods 111 to determine the most useful demand prediction heuristic rules that positively correlate with the one or more simulation scores. In certain embodiments, the processing service 213 can examine the simulation scores of individual goods 111 within the policy to spot specific outliers. In at least one embodiment, the processing service 213 can identify the components of the simulation score that led to the generation of an outlier (e.g., input data 231, demand prediction heuristic rules, processed data) In various embodiments, the processing service 213 can generate distributions of simulation scores within the particular policy to see how various goods 111 react to the same policy. In one or more embodiments, the processing service 213 can analyze individual goods 111 metrics to determine factors that affect the simulation scores. For example, the process- ing service can compare lost sales with service level value to determine which factors lead to the particular simulation score. In some embodiments, the processing service 213 may store the various policies, simulation scores, and/or analyzed data that were identified as outliers for further processing.

At box 711, the process 700 can include optimizing the one or more policies, according to one embodiment of the present disclosure. In various embodiments, the processing service 213 can optimize the one or more policies to increase scores, increase fiscal metrics, and/or overall improve the quality of the one or more policies. In certain embodiments, the processing service 213 may employ various machine learning algorithms and/or optimization functions to improve the policies associated with the one or more goods. For example, the processing service 213 may employ an optimization function to adjust the parameters of the policy that most heavily affect the amount of deadstock present at the particular retailer 101. In various embodiments, the processing service 213 may apply a machine learning opti- mization algorithm to the simulation scores to identify optimal configurations of the policy. In certain embodi- ments, the processing service 213 may select the machine learning optimization algorithm based on the simulation scores. For example, the machine learning optimization algorithm may include a gradient decent optimization algo- rithm for optimizing a minimum stocking requirement and a maximum stocking requirement of the policy. In certain embodiments, the processing service 213 can generate an updated set of demand prediction heuristic rules. In at least one embodiment, the processing service 213 can generate an updated policy based on the optimized values of the mini- mum stocking requirement, the maximum stocking require- ment, and/or any other value of the demand prediction heuristic rules and/or observation data. The processing ser- vice 213 may return to box 705 to simulate the updated policy. The process 700 may continue updating the policy until the processing service 213 determines an optimal policy for the particular good 111 stocked by the retailer 101.

From the foregoing, it will be understood that various aspects of the processes described herein are software pro- cesses that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication net- works. By way of example, and not limitation, such com- puter-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable nonvola- tile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a net- work or another communications connection (either hard- wired, wireless, or a combination of hardwired or wireless) to a computer, the computer properly views the connection as a computer-readable medium. Thus, any such a connec- tion is properly termed and considered a computer-readable medium. Combinations of the above should also be included within the scope of computer-readable media. Computer- executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed innova- tions may be described in the context of computer-execut- able instructions, such as program modules or engines, as described earlier, being executed by computers in networked environments. Such program modules are often reflected and illustrated by flow charts, sequence diagrams, exem- plary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instruc- tions, associated data structures and/or schemas, and pro- gram modules represent examples of the program code for executing steps of the methods disclosed herein. The par- ticular sequence of such executable instructions or associ- ated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi- processor systems, microprocessor-based or programmable consumer electronics, networked PCs, minicomputers, mainframe computers, and the like. Embodiments of the claimed innovation are practiced in distributed computing environments where tasks are performed by local and remote processing devices that are linked (either by hard- wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed innovations will be readily discernible from the description herein, by those of ordinary skill in the art. Many embodiments and adaptations of the disclosure and claimed innovations other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

The embodiments were chosen and described in order to explain the principles of the claimed innovations and their practical application so as to enable others skilled in the art to utilize the innovations and various embodiments and with various modifications as are suited to the particular use contemplated. Alternative embodiments will become apparent to those skilled in the art to which the claimed innovations pertain without departing from their spirit and scope. Accordingly, the scope of the claimed innovations is defined by the appended claims rather than the foregoing description and the exemplary embodiments described therein.

What is claimed:

1. A machine learning system, comprising:
a data store comprising observation data and a plurality of features, the observation data associated with a good stocked by a retailer; and
at least one processor in communication with the data store, the at least one processor being configured to:
retrieve from the data store a first subset of the observation data;
extract from the first subset of the observation data a first subset of the plurality of features;
select a machine learning model based on the first subset of the observation data and the first subset of the plurality of features;
retrieve from the data store a second subset of the observation data;
extract from the second subset of the observation data a second subset of the plurality of features;
calculate a zero-demand probability score by applying the machine learning model to the second subset of the observation data and the second subset of the plurality of features, wherein the zero-demand probability score comprises a probability that the good will have zero demand during a predefined period of time;
generate a no-stocking request for the good stocked by the retailer based on the zero-demand probability score, wherein the no-stocking request includes instructions indicating that no additional quantities of the good should be stocked during the predefined period of time;
calculate a raw-demand score by applying a second machine learning model to a third subset of the observation data, wherein the raw-demand score represents a future demand for the good after the predefined period of time; and
generate a stocking request including instructions to order a determined quantity of the good based on the raw-demand score for stocking after the predefined period of time ends.

2. The machine learning system of claim 1, wherein the observation data further comprises client data, item data, stock value data, stock location data, point in time data, transaction quantity data, or a combination thereof.

3. The machine learning system of claim 1, wherein the plurality of features further comprise demand to-date data, order-timing data, average demand data, minimum demand data, maximum demand data, demand range data, demand variance data, skew data, average lead time data, number of orders data, or a combination thereof.

4. The machine learning system of claim 1, wherein the at least one processor is further configured to:
train the machine learning model using a training data set, wherein the training data set comprises a training subset of the first subset of the observation data and the first subset of the plurality of features;

test the machine learning model using a testing data set, wherein the testing data set comprises a testing subset of the first subset of the observation data and the first subset of the plurality of features;

generate a validation score for the machine learning model; and in response to the validation score falling below a validation score threshold, adjusting at least one of a hyper-parameter associated with the machine learning model.

5. The machine learning system of claim 4, wherein at least one of the hyper-parameter comprises at least one of a number of boosting rounds, a decision tree depth, a learning rate, a minimum data per decision tree leaf, a feature fraction value, and a number of leaves.

6. The machine learning system of claim 4, wherein the validation score threshold comprises a value for validating that the machine learning model correctly predicted the zero-demand probability score.

7. The machine learning system of claim 1, wherein the at least one processor is further configured to:

retrieve an updated subset of the observation data after retrieving the first subset of the observation data and the second subset of the observation data;

extract from the updated subset of the observation data an updated subset of the plurality of features;

calculate a second zero-demand probability score by applying the machine learning model to the updated subset of the observation data and the updated subset of the plurality of features; and generate a second no-stocking request for the good based on the second zero-demand probability score.

8. The machine learning system of claim 1, wherein the machine learning model comprises a gradient boosting algorithm, a Drop-outs meet Multiple Additive Regression Tree (DART), a Gradient-based One-Side Sampling (GOSS), or a Random Forest algorithm.

9. The machine learning system of claim 1, wherein the at least one processor is further configured to:

select a third machine learning model based on a fourth subset of the observation data, a third subset of the plurality of features, and the zero-demand probability score; and calculate a high-demand classification score by applying the third machine learning model to the fourth subset of the observation data, the third subset of the plurality of features, and the zero-demand probability score, wherein the high-demand classification score comprises a likelihood that demand for the good is greater than 150% of a current stock mode.

10. The machine learning system of claim 9, wherein:

the second machine learning model is selected based on the third subset of the observation data, a fourth subset of the plurality of features, the zero-demand probability score, and the high-demand classification score; and the raw-demand score is further generated by applying the second machine learning model to the third subset of the observation data, the fourth subset of the plurality of features, the zero-demand probability score, and the high-demand classification score.

11. The machine learning system of claim 10, wherein the at least one processor is further configured to:

select a fourth machine learning model based on a fifth subset of the observation data, a fifth subset of the plurality of features, the zero-demand probability score, the high-demand classification score, and the raw-demand score; and generate a Quantile regression model by applying the fourth machine learning model to the fifth subset of the observation data, the fifth subset of the plurality of features, the zero-demand probability score, the high-demand classification score, and the raw-demand score.

12. The machine learning system of claim 11, further comprising generating a report comprising the zero-demand probability score, the high-demand classification score, the raw-demand score, and the Quantile regression model.

13. A method for optimizing product supply levels comprising:

retrieving from a data store a first subset of an observation data, the observation data associated with a good stocked by a retailer;

extracting, via at least one processor, a first subset of a plurality of features from the first subset of the observation data;

selecting, via the at least one processor, a machine learning model based on the first subset of the observation data and the first subset of the plurality of features;

retrieving from the data store a second subset of the observation data;

extracting, via at least one processor, the second subset of the plurality of features from the second subset of the observation data;

calculating, via the at least one processor, a zero-demand probability score by applying the machine learning model to the second subset of the observation data and the second subset of the plurality of features, wherein the zero-demand probability score comprises a probability that the good will have zero demand during a predefined period of time;

generating, via the at least one processor, a no-stocking request for the good stocked by the retailer based on the zero-demand probability score, wherein the no-stocking request includes instructions indicating that no additional quantities of the good should be stocked during the predefined period of time;

calculating, via the at least one processor, a raw-demand score by applying a second machine learning model to a third subset of the observation data, wherein the raw-demand score represents a future demand for the good after the predefined period of time; and generating, via the at least one processor, a stocking request including instructions to order a determined quantity of the good based on the raw-demand score for stocking after the predefined period of time ends.

14. The method of claim 13, wherein processing the first subset of the observation data further comprises discretizing the observation data into a plurality of bins and generating one or more histograms of the observation data.

15. The method of claim 13, wherein selecting the machine learning model further comprises:

generating, via the at least one processor, a training data set and a testing data set by randomly splitting a combination of the first subset of the observation data and the first subset of the plurality of features into an 60% partition and a 40% partition, the training data comprising the 60% partition and the testing data set comprising the 40% partition;

applying, via the at least one processor, the machine learning model with the testing data set and the training data set; and adjusting, via the at least one processor, a plurality of hyper-parameters of the machine learning model, the plurality of hyper-parameters comprising a number of boosting rounds, a decision tree depth, a learning rate, a minimum data per decision tree leaf, a feature fraction value, and a number of leaves.

16. A method for optimizing product supply levels comprising:

processing, via at least one processor, a plurality of demand prediction heuristic rules associated with a good stocked by a retailer;

generating, via the at least one processor, a policy based on the demand prediction heuristic rules, wherein the policy comprises a minimum and a maximum stocking requirement for the good;

simulating, via the at least one processor, the policy against historical transaction data associated with the good;

generating, via the at least one processor, a plurality of simulation scores for the policy;

analyzing, via the at least one processor, the plurality of simulation scores for the policy; and in response to the plurality of simulation scores falling below a simulation confidence threshold, optimize, via the at least one processor, the policy.

17. The method of claim 16, wherein the simulation confidence threshold comprises a value for validating that the policy correctly stocked the good.

18. The method of claim 16, wherein optimizing the policy further comprises;

selecting, via the at least one processor, a machine learning optimization algorithm based on the plurality of simulation scores;

applying, via the at least one processor, the machine learning optimization algorithm to the minimum and the maximum stocking requirement of the policy;

generating, via the machine learning optimization algorithm, an updated plurality of the demand prediction heuristic rules; and generating, via the at least one processor, an updated policy based on the updated plurality of the demand prediction heuristic rules for the good stocked by the retailer.

19. The method of claim 18, wherein optimizing the policy further comprises:

simulating, via the at least one processor, the updated policy against the historical transaction data associated with the good;

generating, via the at least one processor, a second plurality of simulation scores for the updated policy;

analyzing, via the at least one processor, the second plurality of simulation scores for the policy; and in response to the second plurality of simulation scores falling below the simulation confidence threshold, optimize, via the at least one processor, updated policy.

20. The method of claim 16, wherein analyzing the plurality of simulation scores further comprises:

generating, via the at least one processor, a plurality of normal distributions associated with the plurality of simulation scores; and identifying, via the at least one processor, a subset of the plurality of simulation scores that fall outside of a predetermined range of the plurality of normal distributions, wherein the predetermined range comprises above a $75^{th}$ percentile and below a $25^{th}$ percentile.

21. The method of claim 16, wherein the plurality of simulation scores further comprise an average period service level value, an average weekly on-hand value, an average weekly transaction value, an average weekly lost transaction value, an average twelve month demand value, and an average twelve month overstock value.

22. The method of claim 16, wherein processing the plurality of demand prediction heuristic rules further comprises:

retrieving from a data store the plurality of demand prediction heuristic rules comprising observation data of the good stocked by the retailer;

extracting, via the at least one processor, a plurality of features from the observation data; and augmenting, via the at least one processor, a the demand prediction heuristic rules with a subset of the plurality of features.

*     *     *     *     *